US012798560B2

(12) United States Patent
Wang et al.

(10) Patent No.: US 12,798,560 B2
(45) Date of Patent: Nov. 17, 2026

(54) SYSTEM AND METHOD FOR MOTION AND PATH PLANNING FOR TRAILER-BASED VEHICLE

(71) Applicant: Mitsubishi Electric Research Laboratories, Inc., Cambridge, MA (US)

(72) Inventors: Yebin Wang, Cambridge, MA (US); Jessica Leu, Berkeley, CA (US); Dongliang Zheng, Atlanta, GA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 226 days.

(21) Appl. No.: 17/815,067

(22) Filed: Jul. 26, 2022

(65) Prior Publication Data

US 2023/0331217 A1 Oct. 19, 2023

Related U.S. Application Data

(60) Provisional application No. 63/363,027, filed on Apr. 14, 2022.

(51) Int. Cl.

| | |
|---|---|
| ***B60W 30/09*** | (2012.01) |
| ***B60W 30/18*** | (2012.01) |
| ***B60W 40/10*** | (2012.01) |

(52) U.S. Cl.

CPC ...... *B60W 30/09* (2013.01); *B60W 30/18009* (2013.01); *B60W 40/10* (2013.01);

(Continued)

(58) Field of Classification Search

CPC ........... B60W 40/10; B60W 30/18009; B60W 30/10; B60W 30/09; B60W 2540/18;

(Continued)

(56) References Cited

U.S. PATENT DOCUMENTS

| | | | | |
|---|---|---|---|---|
| 2010/0286908 | A1* | 11/2010 | Tate, Jr. | G01C 21/3469 701/533 |
| 2014/0188344 | A1* | 7/2014 | Lavoie | B60D 1/62 701/41 |

(Continued)

OTHER PUBLICATIONS

Botros "Lattice-Based Motion Planning with Optimal Motion Primitives" Dec. 23, 2021 (Year: 2021).*

*Primary Examiner* — Fadey S. Jabr
*Assistant Examiner* — Michael J Herrera
(74) *Attorney, Agent, or Firm* — Gene Vinokur

(57) ABSTRACT

A system for controlling a motion of a trailer-based vehicle from an initial state till a target state, wherein each state includes a location and a heading of the trailer-based vehicle. The trailer-based vehicle includes a tractor and at least one trailer attached to the tractor such that the motion of the tractor controls the motion of the trailer. The system is configured to collect a set of motion primitives parameterized on quantized pseudo-trailer-configuration from a finite set of quantized pseudo-trailer-configurations, and repetitively select a node based on corresponding cost, and apply motion primitives at the selected node based on corresponding pseudo-trailer-configuration to add new nodes having pseudo-trailer-configurations belonging to set of all possible values. The system is configured to connect a sequence of multiple motion primitives into motion path connecting initial state with target state and control the motion of the tractor-trailer according to the motion path.

19 Claims, 22 Drawing Sheets

(52) U.S. Cl.
CPC ..... *B60W 2300/14* (2013.01); *B60W 2510/20* (2013.01); *B60W 2520/06* (2013.01); *B60W 2520/10* (2013.01); *B60W 2520/22* (2013.01); *B60W 2530/203* (2020.02); *B60W 2540/18* (2013.01)

(58) Field of Classification Search
CPC ....... B60W 2530/203; B60W 2520/22; B60W 2520/10; B60W 2520/06; B60W 2510/20; B60W 2300/14
See application file for complete search history.

(56) References Cited

U.S. PATENT DOCUMENTS

2014/0303849 A1* 10/2014 Hafner .................. H04N 7/183 701/1
2016/0114831 A1* 4/2016 Laine .................... G08G 1/168 701/41
2017/0177949 A1* 6/2017 Hu ....................... B60W 10/20
2017/0297619 A1* 10/2017 Lavoie ................ B62D 15/024
2019/0080266 A1* 3/2019 Zhu ................... G01C 21/3407
2019/0176818 A1* 6/2019 Movert .................. G06F 16/29
2019/0243371 A1* 8/2019 Nister ..................... G05D 1/65
2020/0001922 A1* 1/2020 Yamamoto ........... B62D 15/029
2020/0097014 A1* 3/2020 Wang ................... B60W 30/06
2020/0377085 A1* 12/2020 Floyd-Jones ......... B60W 30/09
2021/0294333 A1* 9/2021 Jing .................... B62D 15/025
2021/0334671 A1* 10/2021 Minsky ................. G06V 10/70
2021/0389770 A1* 12/2021 Varnhagen ........... G05D 1/0214
2022/0134546 A1* 5/2022 Xu ........................ B25J 13/085 700/250
2022/0161782 A1* 5/2022 Laine ................ B60W 50/0097
2022/0161791 A1* 5/2022 Seegmiller ............ B60W 40/10
2022/0276657 A1* 9/2022 Huh .................... G05D 1/0246
2023/0050172 A1* 2/2023 Yano ...................... G05D 1/693
2024/0300541 A1* 9/2024 Dangel ................ G05D 1/0214

* cited by examiner

SYSTEM AND METHOD FOR MOTION AND PATH PLANNING FOR TRAILER-BASED VEHICLE

TECHNICAL FIELD

The present disclosure relates generally to motion and path planning for trailer-based vehicles, and more particularly to off-lattice motion planning methods for performing motion planning and estimating cost of travel.

BACKGROUND

Control systems employed by vehicles, either autonomous vehicles or vehicles executing in autonomous-driving mode, may be configured to predict motions, or paths, of the vehicle, such that feasibility of the predicted path and obstacle or collision avoidance are addressed simultaneously. The control system may utilize a state-lattice framework to predict or plan the motion or path in Kino dynamic manner. The state-lattice framework may be configured to discretize a finite region of a state space of the vehicle into a finite set of vertices (referred to as lattice, hereinafter) and then construct and search a graph. The state-lattice framework may be executed as on-lattice path planning algorithms. To construct the graph, some node belonging to the lattice is selected, and pre-computed motion primitives (MPs) associated with this node are applied and collision-checked to grow new nodes which also belong to the lattice. The aforementioned process of graph construction might stop if a new node is close enough to a target state. It is noteworthy that the graph may comprise nodes from a set of pre-defined state lattices and edges constructed from a set of pre-computed motion primitives (MPs). An MP represents a kinematically or dynamically feasible transition from one lattice to another.

The graph constructed by the on-lattice path planning algorithms using the pre-defined state lattices may have associated shortcomings. The use of the pre-defined state lattices may compromise feasibility of path planning and quality of predicted path. This is because, in a case where a better path does not pass through any of the pre-defined state lattices, such (better) path may not be selected for use. In addition, a large set of MPs are required to ensure that the generated graph only contains nodes on the pre-defined states lattices.

Owing to difficulty and complexity associated with kinematics and dynamics, it is time-consuming and non-trivial to calculate a solution fulfilling transition from one lattice to another. Optimal control problems (OCP) may be performed in offline for generating the large set of MPs, i.e., pre-computed or computed offline. The generation of the large set of MPs is non-trivial and may be computationally intensive. To this end, restricting the number of MPs to only certain MPs may not accomplish transition between states or lattices over full state space, and may affect generality of the generated graph. As a result, the state space being explored for planning and predicting the path deserves careful design.

A trade-off between the number of MPs and accuracy of path planning may have to be managed to ensure that a predicted path ends close to a goal node and within a reasonable time. In certain cases, the on-lattice path planning algorithms may employ heuristic function for approximating a true cost from a starting state (such as, source) to a goal state (such as, a destination). The heuristic look-up table (HLUT) has been used in the prior art of on-lattice planning methods, which defines the heuristic value at the state lattice only, and thus is merely suitable for on-lattice planning Storing the HLUT may further increase memory burden of the control system. However, planning or predicting path in real-time using the off-lattice path planning algorithms, exploring space beyond the state lattice, and thus requiring the heuristic function being well-defined beyond the state lattice, entails a new method of constructing the heuristic function. The on-lattice path planning algorithms may pose other challenges owing to design of MPs, estimation of cost, and mode selection.

Further, the on-lattice path planning algorithms may impose additional constraints or restrictions on the number of MPs that may be selected or used to accomplish transition merely between lattices, thereby discretizing a reduced-dimensional state space formed for a trailer-based vehicle configuration, representing the spatial pose of the vehicle, and a pseudo-trailer-configuration, representing the spatial pose of the trailers.

Some pseudo-trailer-configuration may be uniquely characterized by a steering angle of the vehicle when certain constraints are imposed. The steering angle may correspond to an angle formed between driving wheels of the vehicle and a heading of the vehicle. Particularly, the pseudo-trailer-configuration indicates a spatial pose of at least one trailer of the vehicle when driving the trailer-based vehicle with a fixed steering angle for an infinite time period. More specifically, when a steering angle of the vehicle is changed from a first steering angle to a second steering angle, the vehicle begins to turn to cause a change of mutual angles between the vehicle and the at least one trailer of the vehicle. However, after a sufficiently long time, the angles or spatial configuration of the trailer-based vehicle stabilizes such that a further motion with the fixed second steering angle does not cause any change of configuration (relative angles between vehicle and trailer(s)). In other words, the motion of the trailer-based vehicle with a fixed steering angle may eventually be circular (straight motion may also be regarded as a circular motion with a zero curvature) that does not change the spatial configuration of the trailer-based system.

With the reduced-dimensional state space, the on-lattice path planning algorithms parameterizes MPs based on the heading of the vehicle and the pseudo-trailer-configuration (or steering angle in prior art). In particular, the parameterization of the MPs means that they are uniquely characterized by the values of their parameters. For example, the parameterization of the MPs on the heading and the pseudo-trailer-configuration means that the MPs are pre-computed offline for different values of the heading and the pseudo-trailer-configuration. This parameterization may ensure that for any node on the lattice, applying the MPs beginning with the same vehicle heading and pseudo-trailer-configuration results in new nodes remaining on the lattice. However, such parameterization of the MPs suffers from various limitations, such as unnecessary loss of feasibility of path planning and compromised path quality (such as extra maneuvers and increased number of cusps, and accuracy) owing to restricting the nodes to stay on the lattice, as well as large memory to store a large set of MPs and HLUT.

SUMMARY

It is an object of some embodiments to disclose off-lattice path planning techniques that allows real-time and accurate path generation for trailer-based vehicles. It is another object of some embodiments to disclose an off-lattice path planning method where the graph construction searches for nodes or intermediate milestone states beyond a pre-defined state lattice, instead of involving arbitrary values in tractor configuration. It is another object of some embodiments to disclose a new type of parameterization of motion primitives suitable for computationally efficient, online, and real-time path planning. It is another object of some embodiments to provide such a method that provides MPs for generating a graph for path planning. It is another object of some embodiments to provide such system and method that approximates cost suitable for off-lattice path planning to reduce computational complexity and/or memory requirements.

Some embodiments are based on realization that the on-lattice control system for planning path and motion of a trailer-based vehicle requires MPs to be parameterized over a vehicle heading and a pseudo-trailer-configuration of the trailer-based vehicle. The parameterization of the MPs is necessary as lattice definition (by discretizing the reduced-dimensional state space) is not invariant under rotation operation. In this regard, state lattice, denoted by 'SL', is obtained by discretizing the reduced-dimensional state space. Further, when the state lattice 'SL' is rotated at the vehicle's yaw axis at a degree that does not equals to n*90 degrees, then a new state lattice 'SL1' after the rotation is different from the original lattice 'SL'. In particular, both sets contain distinctive elements. Hence on-lattice planning entails MPs to be parameterized by the vehicle heading and the pseudo-trailer-configuration.

While the MPs are invariant to a location of the trailer-based vehicles, i.e., the motion primitives may be pre-computed without considerations of the location of the trailer-based vehicles and may be applied online at arbitrary locations. The computation of the MPs may need to consider other state variables which results in increasing their number and memory consumption.

Some embodiments are based on the understanding that pre-computed MPs may reduce computational burden during the online path planning. However, a large amount of possible pre-computed MPs may lead to an optimization problem in selecting the best MPs to form a motion path—a combinatory optimization problem in essence. It may be noted that with a high number of MPs, computational complexity incurred by the off-lattice path planning algorithms may be equally high. Therefore, it is an object of some embodiments to provide such a method that achieves faster, more accurate and more reliable online path or motion planning with a smaller number of MPs.

It is an object of some embodiments to provide off-lattice motion planning for autonomous trailer-based vehicles thereby overcoming the drawbacks of the on-lattice path planning Additionally, it is an object of some embodiments to provide an off-lattice path planning suitable for online motion-control applications.

The off-lattice motion planning aims to construct a graph (or a tree as a special case) where its nodes are not necessarily on the state lattice, or the lattice in short, and thus the MPs for off-lattice motion planning can be parameterized on the pseudo-trailer-configuration only.

Some embodiments of this disclosure are based on the realization that the pseudo-trailer-configurations may be obtained by introducing algebraic constraints on the relative degrees of trailers to achieve dimension reduction. For example, some algebraic constraints enforce that all vehicle and trailers have a same yaw rates, which implies a so-called stable circular configuration. The stable circular configuration is uniquely determined by the steering angle of the vehicle.

Some embodiments of this disclosure are based on the realization that the one-dimensional pseudo-trailer-configuration, along with the three dimensions representing a vehicle configuration, forms a four-dimensional reduced state space, which further avoids the curse of dimensionality during graph construction, because the graph comprises nodes defined over the reduced state space.

Some embodiments of this disclosure are based on the realization that in order to deal with fast kinematically or dynamically feasible transition between nodes of the graph, it is important to pre-compute a set of MPs offline. The set of MPs requires a discretization of the pseudo-trailer-configuration dimension.

Some embodiments of this disclosure are based on discretizing the pseudo-trailer-configuration dimension according to uniformly discretizing the steering angle over its admissible domain. Some embodiments of this disclosure are based on the realization that the pseudo-trailer-configuration dimension may be discretized as a finite set of such elements each of which represents a preferred pose of trailers according to human drivers' knowledge.

Some embodiments of this disclosure are based on the realization that the off-lattice motion planning disclosed in this disclosure requires a heuristic function to estimate cost-to-go, which is defined beyond the lattice. It is also recognized that the cost-to-go for tractor-trailer system may not be solved exactly, and thus has to be approximated.

Some embodiments of this disclosure are based on the realization that the cost-to-go function over the reduced state space may be learned by machine learning over a certain compact domain, due to the machine learning nature. Therefore, there is a need to combine learning-based cost-to-go estimate with a global cost-to-go estimate.

As such, some embodiments quantized the possible space of the pseudo-trailer-configuration to produce a finite set of values and pre-compute the MPs such that each MP starts at a configuration of a trailer-based vehicle governed by one of the steering angles in the finite set, wherein the vehicle configuration is (0,0,0), and ends in a configuration of the trailer-based vehicle governed by one of the pseudo-trailer-configuration in the same finite set, wherein the vehicle configuration has non-zero (x,y), and heading. In such a manner, for a node with any of pseudo-trailer-configuration in the finite set, there are multiple pre-computed MPs that can be selected online, and that applying them results in new nodes with pseudo-trailer-configuration staying in the finite set and guarantees that the planning explores the reduced-dimensional state space including vehicle configuration in continuous state space and the pseudo-trailer-configuration confined to a finite set.

Some embodiments of this disclosure perform mode selection for a selected node, based on the mode cost, which is induced by the sum of costs of applying MPs and the estimated cost-to-go of the child nodes result from the applied MPs.

Accordingly, one embodiment discloses a system for controlling a motion of a trailer-based vehicle from an initial state till a target state. Each state includes at least a location and a heading of the trailer-based vehicle. The trailer-based vehicle includes a tractor and at least one trailer attached to the tractor such that a motion of the tractor controls a motion of the trailer. The system is configured to collect a set of motion primitives (MPs) parameterized on a quantized pseudo-trailer-configuration from a finite set of quantized pseudo-trailer-configurations, each MP being configured to move the trailer-based vehicle from a pseudo-trailer-configuration induced initial state relating to the finite set of quantized pseudo-trailer-configurations to another pseudo-trailer-configuration induced target state having a same or different pseudo-trailer-configuration relating to the finite set of quantized pseudo-trailer-configurations. The system is configured to repetitively select a node based on corresponding cost and apply MPs at the selected node based on a corresponding pseudo-trailer-configuration to add new nodes having pseudo-trailer-configurations belonging to a set of all possible values. The tractor configuration $(x, y, \theta_0)$ is arbitrary. The tractor location, represented by (x, y), is also arbitrary. The system is configured to connect a sequence of multiple MPs into a motion path connecting the initial state with the target state. A starting value of a quantized pseudo-trailer-configuration of a subsequent MP in the sequence equals an ending value of a quantized pseudo-trailer-configuration of a previous motion primitive in the sequence. The system is further configured to control the motion of the trailer-based vehicle according to the motion path.

The set of MPs may include multiple motion primitives pre-calculated for each pseudo-trailer-configuration induced state with an initial state of the tractor configuration being (0,0,0), wherein a starting value of the quantized pseudo-trailer configuration relates to the finite set of quantized pseudo-trailer configurations.

The MPs for the starting value or MPs for an ending value may include multiple MPs with a same pseudo-trailer configuration but moving the trailer-based vehicle into different locations.

The pseudo-trailer-configuration is represented by a steering angle value, and relative angles between headings of the at least one trailer attached to the tractor are functions of steering angles.

The pseudo-trailer-configuration is represented by a relative angle between a heading of the tractor and a heading of an adjacent trailer, and headings of the adjacent trailers are functions of the pseudo-trailer-configuration.

The system is further configured to construct a graph having multiple nodes defining states of the trailer-based vehicle with tractor configurations being unrestricted to pre-defined real values, wherein the nodes include at least one of a final node or a goal node defining the initial state of the trailer-based vehicle, and a root node defining the target state of the trailer-based vehicle. Each pair of nodes in the graph is connected with an edge defined by a collision-ignorant MP from the set of motion primitives. The system is configured to determine a first trajectory from at least one of the final node or the goal node to the root node of the graph. The system is configured to determine a second trajectory from the initial state to the root node of the graph. Each node may have the location and the heading of the tractor, and each node may be arbitrary.

The system is configured to select nodes of the graph according to a cost of each of the selected nodes, wherein the cost of a node includes a cost of arrival and an estimated cost-to-go determined by evaluating a heuristic function.

In addition, the system is configured to calculate the estimated cost-to-go of each of the selected nodes using a continuous function approximator, such as a neural network.

Some embodiments disclose that the neural network has an input as two states of the trailer-based vehicle in one of an original state space or a reduced state space.

Some embodiments disclose that the cost-to-go is estimated by a finite number of neural networks, wherein each neural network has a different pseudo-trailer-configuration induced state for its target state. Given a pseudo-trailer-configuration $\xi_4 \in \Xi$, a pseudo-trailer-configuration induced state is given by $\overline{X}_{ptc}=(0,0,0,\xi_4)$.

Some embodiments as based on the understanding that the reinforcement learning is trained with a sparse reward function.

The neural network is obtained by training with supervised learning.

The system is configured to obtain a path from at least one of the final node or the goal node to the root node of the graph. The system is configured to record a moving direction, a steering action, and lengths of each edge. The system is configured to acquire a first segment of the path with same moving direction; and plan velocity and steering profiles for the first segment, based on the moving direction. The system is configured to remove the first segment from the path; and repeat recording, acquiring, planning, and removing until the path is empty.

The system is configured to pass the first trajectory to an iterative linear quadratic regulator (ILQR) to produce a second trajectory candidate. The system is configured to check collision of the second trajectory candidate. The system is configured to output the second trajectory candidate as the second trajectory if it is collision-ignorant; else, the system is configured to solve an optimization problem for the second trajectory.

The system is configured to identify a collision-ignorant convex hull that contains the initial state and the final node. The system is configured to determine a candidate state on the first trajectory to which the initial state is connected to. The system is configured to solve a steering problem from the initial state to the candidate state. The system is configured to concatenate a solution of the steering problem with a portion of the first trajectory from the candidate node to the root node.

Another embodiment discloses a method for controlling a motion of a trailer-based vehicle from an initial state till a target state, wherein each state includes at least a location and a heading of the trailer-based vehicle. The trailer-based vehicle includes a tractor and at least one trailer attached to the tractor such that a motion of the tractor controls a motion of the trailer. The method comprises collecting a set of motion primitives parameterized on a quantized pseudo-trailer-configuration from a finite set of quantized pseudo-trailer-configurations, wherein each motion primitive is configured to move the trailer-based vehicle from a pseudo-trailer-configuration induced initial state relating to the finite set of quantized pseudo-trailer-configurations to another pseudo-trailer-configuration induced target state having a same or different pseudo-trailer-configuration relating to the finite set of quantized pseudo-trailer-configurations. The method comprises repetitively selecting a node based on a corresponding cost and applying motion primitives at the selected node based on a corresponding pseudo-trailer-configuration to add new nodes having pseudo-trailer-configurations belonging to a set of all possible values. The tractor configuration $(x, y, \theta_0)$ may be arbitrary. The method comprises connecting a sequence of multiple motion primitives into a motion path connecting the initial state with the target state, wherein a starting value of a quantized pseudo-trailer-configuration of a subsequent motion primitive in the sequence equals an ending value of a quantized pseudo-trailer-configuration of a previous motion primitive in the sequence. The method comprises controlling the motion of the trailer-based vehicle according to the motion path.

Yet another embodiment discloses a non-transitory computer readable storage medium embodied thereon a program executable by a processor for performing a method for controlling a motion of a trailer-based vehicle from an initial state till a target state wherein each state includes at least a location and a heading of the trailer-based vehicle. The trailer-based vehicle includes a tractor and at least one trailer attached to the tractor such that the motion of the tractor controls the motion of the trailer. The method comprises collecting a set of motion primitives parameterized on a quantized pseudo-trailer-configuration from a finite set of quantized pseudo-trailer-configurations, wherein each motion primitive is configured to move the trailer-based vehicle from a pseudo-trailer-configuration induced initial state relating to the finite set of quantized pseudo-trailer-configurations to another pseudo-trailer-configuration induced target state having a same or different pseudo-trailer-configuration relating to the finite set of quantized pseudo-trailer-configurations. The method comprises repetitively selecting a node based on a corresponding cost and applying motion primitives at the selected node based on a corresponding pseudo-trailer-configuration to add new nodes which have pseudo-trailer-configurations belonging to a set of all possible values. The tractor configuration (x, y, $\theta_0$) may be arbitrary. The method comprises connecting a sequence of multiple motion primitives into a motion path connecting the initial state with the target state, wherein a starting value of a quantized pseudo-trailer-configuration of a subsequent motion primitive in the sequence equals an ending value of a quantized pseudo-trailer-configuration of a previous motion primitive in the sequence. The method comprises controlling the motion of the trailer-based vehicle according to the motion path.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

DETAILED DESCRIPTION

It is an object of some embodiments to disclose a path and/or motion planning method that allows online and real-time path generation for automated vehicle control of trailer-based vehicle. It is another object of some embodiments to disclose an off-lattice path planning method where the graph construction searches for nodes or intermediate milestone states beyond a pre-defined state lattice, instead involving arbitrary values in tractor configuration. It is another object of some embodiments to disclose a new type of parameterization of motion primitives suitable for computationally efficient, online, and real-time path planning. For clarity purposes only, some embodiments are described in relation to automated parking scenario. However, principles explained in relation to parking scenarios are used by alternative embodiments in other automated vehicle control applications.

Figure 1A:
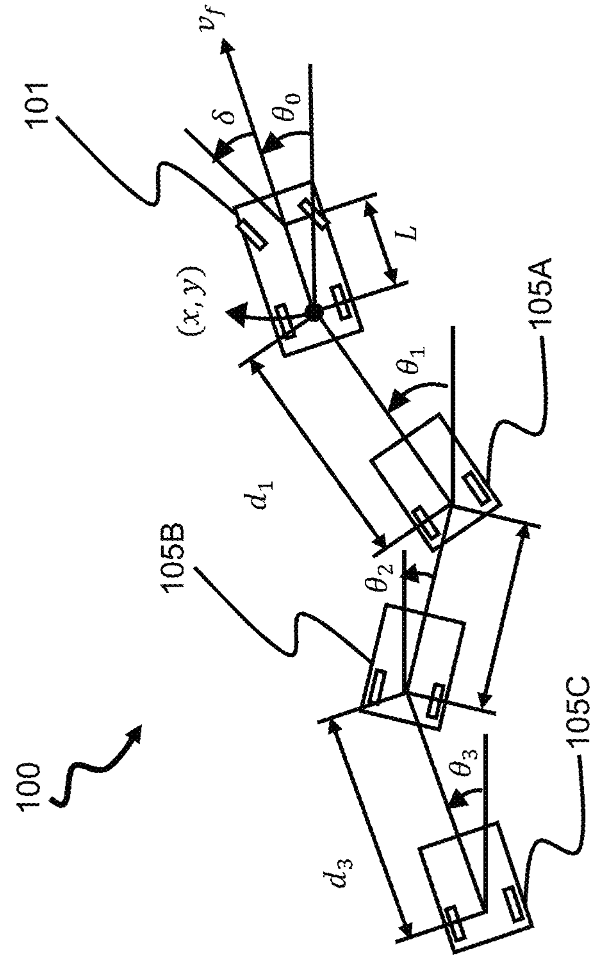
FIG. 1A shows an example trailer-based vehicle system, in accordance with an embodiment of the present disclosure.

FIG. 1A shows an example trailer-based vehicle system 100, in accordance with an embodiment. The trailer-based vehicle system 100 includes a tractor 101 and three trailers, depicted as trailers 105A, 105B, and 105C, attached to the tractor 101. The tractor 101 may employ a front-wheel drive mechanism, and may have a configuration (x, y, $\theta_0$). In this regard, $(x, y)^T$ are coordinates of a midpoint of a rear wheel axis of the tractor 101, representing a location of the tractor 101, and $\theta_0$ is a tractor orientation (or heading). In accordance with present disclosure, the term "orientation" and "heading" are used interchangeably. To this end, a motion of the tractor 101 governs a motion of the trailers 105A-105C.

In an example, the trailer-based vehicle system 100 may be a tractor-trailer including a tractor 101 having actuators controlling its motion and one or more trailers (depicted as trailers 105A-105C) attached to the tractor 101 directly or indirectly through other trailers. Configurations of the tractor-trailer 100 may vary based on their dimensions, carrying capacities, and attachment between tractor 101 and trailers 105A-105C. These configurations may have different types and names. For example, a semi-trailer attaches to the tractor 101 with a type of hitch called a fifth wheel. From the point of view of control of the autonomous tractor-trailer 100, the types of configurations affect their dynamics governing the response of the trailers 105A-105C to the motion of the tractor 101.

Continuing further, the $i^{th}$ trailer has a configuration $\theta_i$, representing its orientation. The trailer-based vehicle system 100 has a trailer configuration ($\theta_1$, $\theta_2$, $\theta_3$), that specifies relative orientation of the trailers 105A-105C with respect to the positive direction of the x-axis. As shown, a following trailer, such as trailer 105A-105C, is coupled to a midpoint of a rear wheel axis of a corresponding front tractor 101 or trailer 105A-105B. The front-wheels of the tractor 101 may have a velocity $v_f$, and a steering angle $\delta$. Moreover, a distance between (x, y) and a midpoint of a front-wheel axis is denoted as 'L'. The control inputs are $v_f$ and $\delta$, where the velocity is subject to a constraint $|v_f|\leq v_{max}$, and the steering angle is subject to a mechanical constraint $|\delta|\leq_{max}$, with $v_{max}$, $\delta_{max}$ being constants.

It may be noted, the embodiments described herein are not limited to three-trailed based vehicle system with tractor-trailer. In other embodiments of the present disclosure, the tractor-based vehicle system may have other types of coupling mechanisms between tractor and trailers, or with different number of trailers. For example, a following trailer may be hinged on a rear-end of a leading tractor or trailer.

In some embodiment, $v_f$ and $\delta$ may be independently controlled, and the new control variables are introduced as: $U=(v, s)^T=(\cos(\delta)v_f, (\tan(\delta)/\tan(\delta_{max})))^T$, where $\tan(\delta_{max})=L/R$, and $s\in[-1, 1]$ is a normalized steering angle. Here R is the minimum turning radius of the tractor. It is beneficial to represent the kinematics of the tractor-trailer system in the state coordinates $X=(x, y, \theta_0, \theta_1-\theta_0, \theta_2-\theta_1, \theta_3-\theta_2)$ T, under which the model of the kinematics is given by $$\begin{aligned} \dot{x} &= \cos(\theta_0)v \\ \dot{y} &= \sin(\theta_0)v \\ \dot{\theta}_0 &= \frac{vs}{R} \\ \dot{\xi}_4 &= -v\frac{d_1 s + \sin(\xi_4)R}{Rd_1} \\ \dot{\xi}_5 &= -v\frac{d_1\cos(\xi_4)\sin(\xi_5) - d_2\sin(\xi_4)}{d_1 d_2} \\ \dot{\xi}_6 &= -v\cos(\xi_4)\frac{d_2\cos(\xi_5)\sin(\xi_6) - d_3\sin(\xi_5)}{d_2 d_3}. \end{aligned} \tag{1}$$

It may be noted that $\xi_4=\theta_1-\theta_0$, $\xi_5=\theta_2-\theta_1$, $\xi_6=\theta_3-\theta_2$ represent the relative angles between adjacent tractor and trailers. Further, $X\subset\mathbb{R}^6$ denotes the state space formed by all possible X. The constraints to prevent a jack-knife pose are:

$$|\xi_i| \leq \xi_{max},\ 4 \leq i \leq 6. \tag{2}$$

In some embodiments, the maximum relative angle $\xi_{max}$ is less than $$\frac{\pi}{2}.$$

The trailer-based vehicle system 100 is subject to additional state and control constraints:

$$0 \leq \theta_0 < 2\pi,\ |v| \leq v_{max},\ |s| \leq 1. \tag{3}$$

In an embodiment, the constraint on the tractor 101 heading is defined by $-\pi\leq\theta_0<\pi$.

In another embodiment, the kinematic model of the trailer-based vehicle system 100 may be augmented by treating one of or all control input $(v, s)^\perp$ as additional state variables to yield a dynamic model. In this regard, when $(v, s)^\perp$ are treated as state variables, the new control input is $U=(a, v_s)^\perp$, where a, $v_s$ represent the tractor acceleration and the angular rate of change of the normalized steering angle. The trailer-based vehicle system 100 has the following dynamic model:

$$\begin{aligned} \dot{x} &= \cos(\theta_0)v \\ \dot{y} &= \sin(\theta_0)v \\ \dot{\theta}_0 &= \frac{vs}{R} \\ \dot{\xi}_4 &= -v\frac{d_1 s + \sin(\xi_4)R}{Rd_1} \\ \dot{\xi}_5 &= -v\frac{d_1\cos(\xi_4)\sin(\xi_5) - d_2\sin(\xi_4)}{d_1 d_2} \\ \dot{\xi}_6 &= -v\cos(\xi_4)\frac{d_2\cos(\xi_5)\sin(\xi_6) - d_3\sin(\xi_5)}{d_2 d_3} \\ \dot{v} &= a \\ \dot{s} &= v_s, \end{aligned} \tag{4}$$

The new control inputs are typically subject to bounded constraints: $|a|\leq a_{max}$, $|\dot{s}|\leq v_{s,max}$ where $a_{max}$, $v_{s,max}$ denotes the maximum acceleration and maximum steering rate, respectively. Original control constraints on (v, s) are treated as state constraints.

Figure 1B:
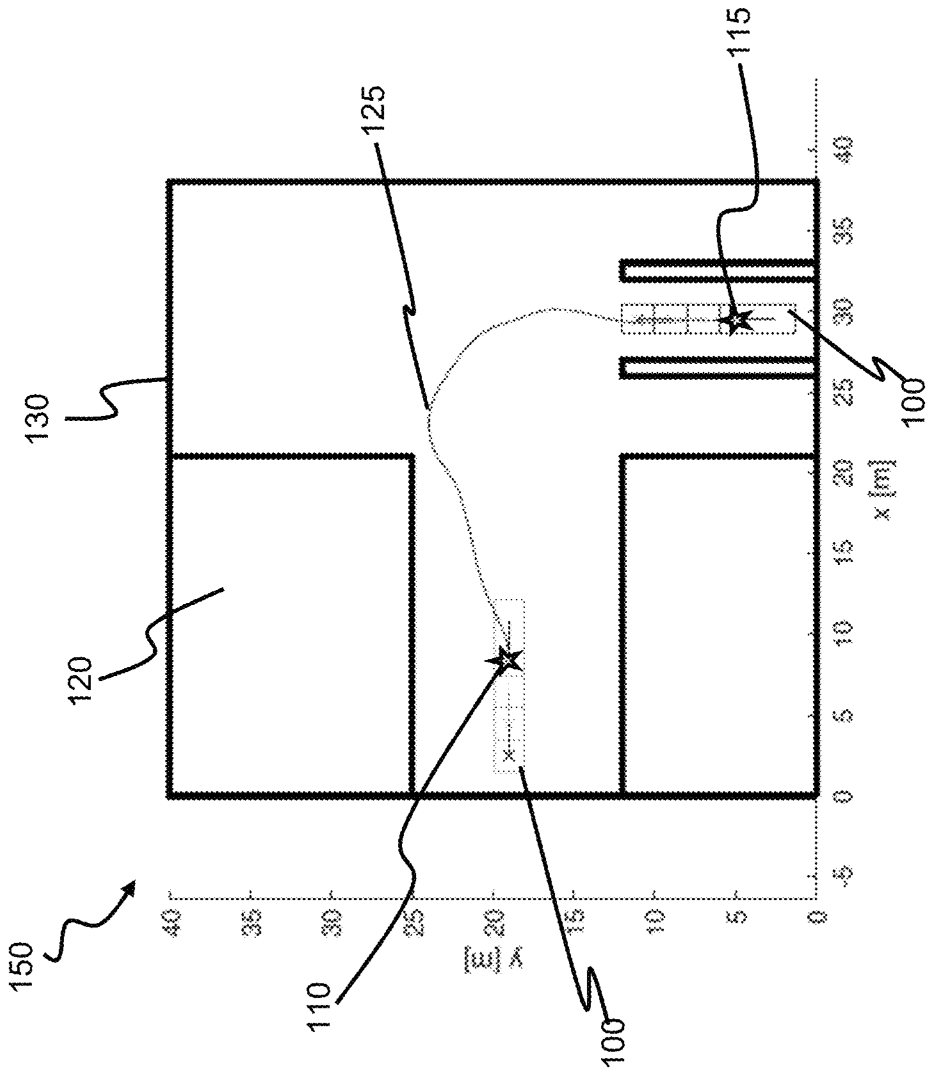
FIG. 1B shows an example parking space environment for trailer-based vehicle system, in accordance with an embodiment of the present disclosure.

FIG. 1B shows an example parking space environment 150 for a trailer-based vehicle system 100, in accordance with an embodiment. The trailer-based vehicle system 100, referred to as tractor-trailer 100, has an initial location 110 and needs to be parked at a parking spot defined by a target location 115. The tractor-trailer 100 is to be parked without trespassing or colliding with a boundary 130 of the parking space 150, and without colliding into various obstacles (depicted as obstacle 120). The embodiments described in the present disclosure may also be applicable to other scenarios when the initial location and the target location are exchanged, or the initial location and the target location are changed, such as when driving a highway.

In some embodiments, the initial location 110 and target location 115 may have corresponding location information. Based on the location information, spatial locations of all points of the tractor-trailer 100 may be determined uniquely. The locations 110 and 115 may be used to determine corresponding states of a kinematic model of the tractor-trailer 100. The initial and target locations 110 and 115 correspond to the initial state $X_0$ and the target state $X_f$, respectively. Pursuant to present disclosure, location and state are used interchangeably below to refer to the same thing.

The parking space environment 150 includes obstacles. For example, the obstacle 120 may be a part of fixtures of the parking space environment 150, i.e., permanent obstacles (such as boundary walls and/or columns of the parking space environment 150), or parked vehicles. Dimensions of the obstacle 120 may be known or may be estimated to a reasonable extent. FIG. 1B depicts a non-limiting example of such dimensions.

In some embodiments, a layout of the parking space environment 150 and a position and heading of static obstacles are specified as a part of a map of the parking space environment 150. The map may be predetermined or constructed in real time during or before a parking task for parking the tractor-trailer 100 at target state 115.

Geometrical dimensions of any parked vehicles, presented as obstacle 120, within the parking space environment 150 may be determined based on corresponding types. In one embodiment, obstacle 120 in the parking space 200 may be approximated as simple 2D geometric objects, such as circles, rectangles, and so forth. For example, rectangles may be derived by constructing minimal bounding boxes of the obstacle 120. With geometric approximation of the obstacle 120, and the boundary 130 of the parking space environment 150, the parking space environment 150 may be fully described by a list of geometric objects, referred to as map, hereinafter.

Some embodiments determine a path or motion 125 for the tractor-trailer 100 to follow between its initial location 110 and the target location 115, while avoiding the collision with the obstacle 120 and the boundary 130 in the parking space environment 150. The path 125 is kinematically admissible if it satisfies a kinematic model that governs how the state X of the tractor-trailer 100 evolves over time. The path 125 is kinematically feasible if it is kinematically admissible and collision free or collision-ignorant when the tractor-trailer 100 moves along the path 125 towards 115. In particular, a point X of the path 125 is collision-free if any portion of the tractor-trailer staying at X does not overlap with any obstacle 120, or boundary 130 in the parking space environment 150.

Tractor-trailer and trailer-based system are used interchangeably below to refer 100.

In some embodiments, the path 125, specifying how fast the tractor-trailer 100 moves along the path 125, is dynamically feasible. That is: it satisfies a dynamic model of the tractor-trailer.

In some embodiments, the path 125 is generated according to either a kinematic model or a dynamic model. The tractor-trailer 100 typically starts with and ends at zero velocity and steering angle, and thus the initial and target states for the dynamic model may be defined accordingly. The embodiments described in the present disclosure may be applied to both the kinematic model and the dynamic model.

Without loss of generality, the following description is described on the basis of the kinematic model.

While a state space of a regular vehicle can be defined by its location and orientation, however, a state space of the trailer-based vehicle 100 includes heading angles of the tractor 101 and the trailers 105A-105C, or the heading angle of the tractor 101 and relative heading angles of trailers 105A-105C with respect to each other.

To this end, a state-lattice approach is used to first discretize a finite region of a state space of the trailer-based vehicle (or tractor trailer) 100 into a finite set of vertices, referred to as the lattice. Thereafter, the state-lattice approach is used to construct and search a graph where vertices (or nodes) are pre-defined lattice, and the edges are from a set of pre-computed motion primitives (MPs) to address kinematic and dynamic feasibility. Since the MPs can be generated offline by solving optimal control problems (OCP) with kinematics or dynamics being constraints, the difficulty incurred by the complex kinematics or dynamics is managed offline, while leaving an online process to deal with collision avoidance. However, the state-lattice (or on-lattice) approach requires a large set of as the MPs constructing a graph where its nodes stay on the lattice, and are lattice dependent (as explained before, depending on the tractor's heading and trailers' headings). Designing of such a large set of MPs is non-trivial, incurs a large memory and is computationally intensive. To this end, utilizing MPs which accomplish transition between states over the full state space have high dimensionality, and thus is not suitable for real-time path planning of trailer-based vehicle 100.

In certain cases, the dimensionality of state used to represent the nodes in the graph may be reduced. The reduced-dimensional state space for on-lattice path planning parameterizes MPs based on a heading of the tractor 101 and a pseudo-trailer-configuration (e.g., steering angles). This parameterization is necessary to ensure that any node on the lattice that is applying the MPs beginning with the same tractor heading and pseudo-trailer-configuration results in new nodes remaining on the lattice. However, such parameterization suffers from various limitations, such as loss of feasibility and compromised path quality owing to restricting the nodes to stay on the lattice, as well as large memory to store a large set of MPs and heuristic look-up tables.

Figure 2A:
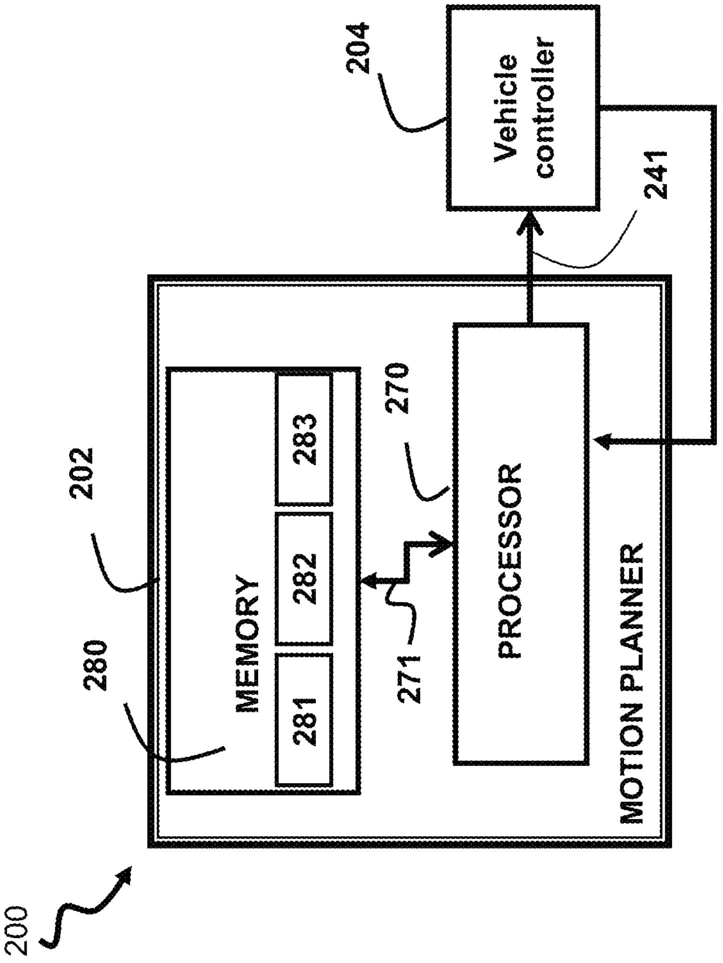
FIG. 2A shows a block diagram of a general structure of a control system, in accordance with an embodiment of the present disclosure.

FIG. 2A shows a block diagram 200 of a general structure of a control system 202, according to one embodiment. The control system 202 includes at least one processor 270 for executing modules of the control system 202. The processor 270 is connected 271 to a memory 280 that stores geometrical information 281 such as geometry of the tractor-trailer 100 and a map of the parking space environment 150. The memory 280 may also store model information 282 of the tractor-trailer 100 such as a kinematic model of a vehicle and/or a dynamic model of a vehicle. The memory 280 may also store internal information 283 of the control system 202, including, but not limited to, an initial state of the tractor-trailer 100, a target state of parked tractor-trailer 100, cost function, values of each computed state, the motion leading up to each state, a geometric graph, a kinematic graph, waypoints, reference trajectory. In some embodiments, the memory 280 may include stored instructions implementing a method for controlling a motion of the tractor-trailer 100, wherein the instructions, when executed by the processor 270 conduct at least some steps of the method.

Figure 2B:
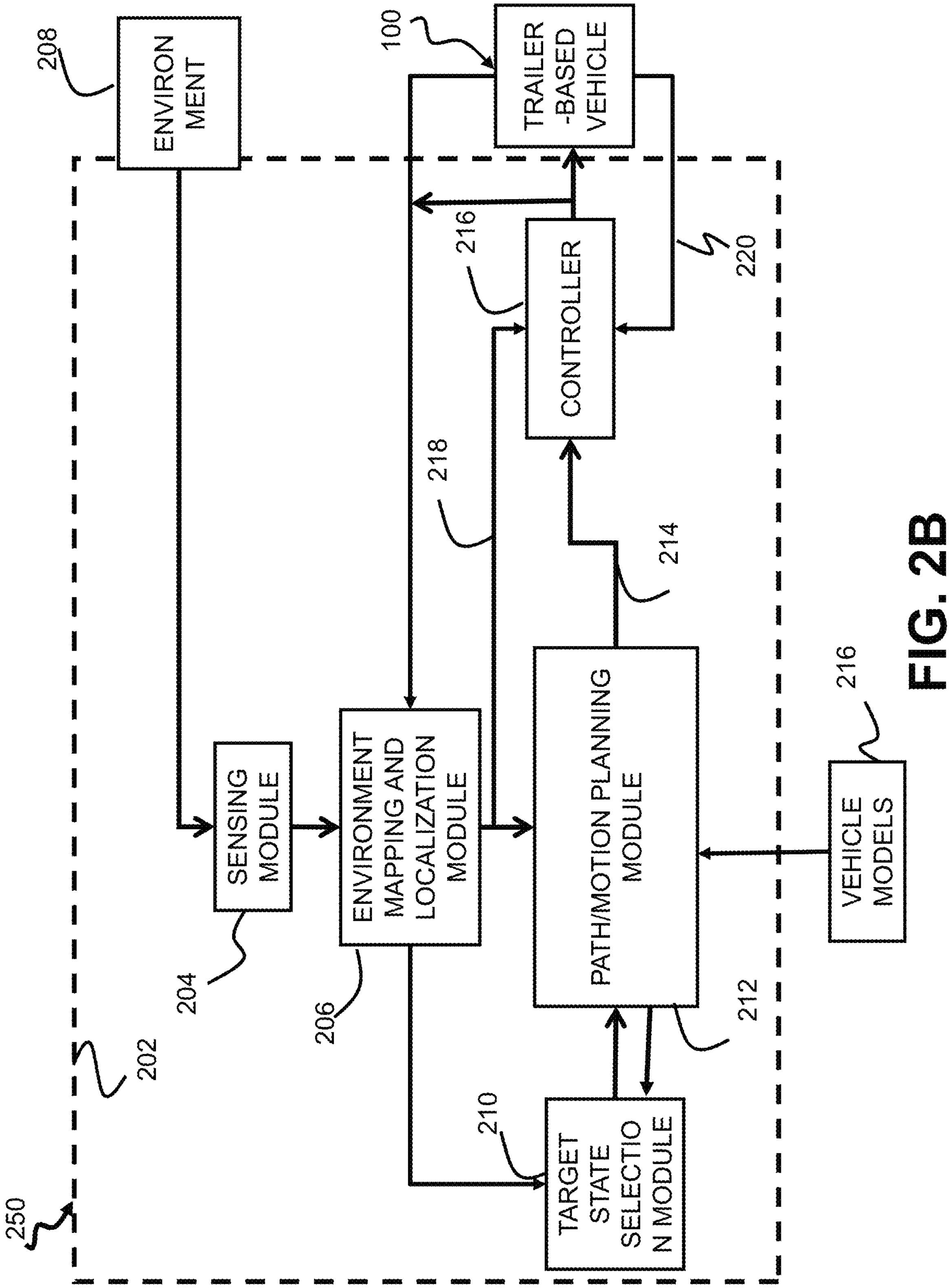
FIG. 2B shows a block diagram of an example control system for performing motion planning of trailer-based vehicle, in accordance with an embodiment of the present disclosure.

FIG. 2B shows a block diagram 250 of an example control system 202 for performing automated parking of trailer-based vehicle 100, in accordance with an embodiment. FIG. 2B is explained in conjunction with FIGS. 1A and 1B.

The control system 202 includes a sensing module 204 that is configured to sense the environment and vehicle operation condition. The control system 202 includes an environment mapping and localization module 206 that constructs and/or updates a map of an environment 208. The environment mapping and localization module 206 determines a current location of the tractor-trailer 100. For example, sensors in the sensing module 202 to sense the environment 208 may include, but are not limited to, video cameras for capturing obstacles including other vehicles, pedestrians, and buildings; ultrasonic/radar; and LiDAR sensors for detecting distance between the tractor-trailer 100 and obstacles 120, boundary 130, etc. In an example, the environment 208 may be associated with a parking space environment, such as the parking space environment 150. In one embodiment, the environment map of the environment 208 is further processed to generate a geometric representation of the parking space environment 150, as shown in FIG. 1B.

In accordance with an embodiment, the control system 202 may include an inertial measurement unit (IMU) that may include 3-axis accelerometer(s), 3-axis gyroscope(s), and/or magnetometer(s). The IMU may be used to sense the vehicle operation. Further, the control system 202 may include a global positioning system sensor for providing position, headings, and velocity of the tractor-trailer 100 (including trailers).

Pursuant to embodiments of the present disclosure, the control system 202 includes a target state selection module 210 that selects a target location (and subsequently, target state) for the tractor-trailer 100 and a path/motion planning module 212. In an example, the target location may be a parking spot for parking the tractor-trailer 100. In such a case, the location of parking spot may correspond to a target state for the tractor trailer 100, while an initial position of tractor trailer 100 may correspond to an initial state. For example, the selection of the parking spot may be made by identifying one or more parking lot candidates and submitting the target location to the path/motion planning module 212. The path/motion planning module 212 may initiate a complete motion planning procedure to determine a reference trajectory 214 for the tractor-trailer 100 based on one or combination of vehicle models, the initial and target states of the tractor-trailer 100, and the map of the parking space environment 208. For example, in one embodiment, the reference trajectory 214 defines a combination of profiles of a vehicle velocity and steer angle over time, the state $X^*(t)$, and acceleration and steering rate $a^*(t)$, $v_s^*(t)$.

Continuing further, the path/motion planning module 212 transmits the reference trajectory 214 to a controller 216 of the tractor-trailer 100. On receiving the reference trajectory 214, the controller 216 may determine and exert control commands to enforce that the tractor-trailer 100 state accurately tracks the reference state trajectory corresponding to the reference trajectory 214. In one embodiment, the control commands could be gas pedal pressure and/or steering torque. In addition, the controller 216 may also use signal 218 and 220 to determine the control commands. The signal may indicate, for example a measured steering angle, a measured current of motors moving the steering wheel or the gas pedal, the output of the IMU, and the initial state of the tractor-trailer 100 measured or estimated by the environment mapping and localization module 206.

In accordance with an embodiment of the present disclosure, the path/motion planning module 212 needs to address its kinematic/dynamic admissibility and collision avoidance. In this regard, the path/motion planning module 212 may find a sequence of collision-free intermediate milestone states between the initial state 110 and the target state 115, where two adjacent milestones states, without ambiguity also referred to as nodes, are connected by a short kinematically/dynamically feasible segment. In an example, the search for the intermediate milestone states may include identifying or determining milestone state candidates, rejecting, or accepting milestone state candidates according to kinematic/dynamic admissibility and collision-ignorant or collision-free requirements, and adding accepted milestone state candidates to a tree or a graph.

In accordance with an embodiment, the intermediate milestone states may be determined by sampling control input space and integrating the kinematic model with the sampled control over time so that kinematic/dynamic admissibility is accounted. This may result in exploring a 6-dimensional state space X when the kinematic model is used in the planning, or an 8-dimensional state space when the dynamic model is used.

In accordance with an embodiment, path planning over the 6-dimensional state space (constructing nodes represented by 6-dim states) or identifying or proposing intermediate milestone state candidates in the 6-dim state space, is dominated by the dimensionality of the state space. Therefore, the path planning process is computationally prohibitive. To overcome the drawbacks associated with dimensionality of search space during the stages of identifying and proposing intermediate milestone state candidates, the intermediate milestone state candidates may be restricted over a reduced state space.

In accordance with an embodiment, during the construction of a tree or graph, the intermediate milestone states may have different dimensionality than the states of kinematic/dynamic models of the path/motion planning module 212. This allows the planning over a lower dimensional state space, even though the transition trajectory between any two intermediate milestone states is 6-dimensional. In other words, the path 125 remains 6-dimensional.

In accordance with an embodiment, the path planning over the reduced state space includes constructing and searching a tree or a graph which contains nodes denoting intermediate milestone states in the reduced state space, and edges representing kinematically and dynamically feasible solutions connecting two nodes, respectively. Although the nodes are represented by elements in the reduced state space, the kinematically or dynamically feasible solutions, corresponding to the edges, evolve over the original state space $\mathcal{X}$.

In order to facilitate identifying and proposing intermediate milestone state candidates over the reduced state space, the control system 202 may introduce virtual constraints on the original state $\mathcal{X}$ so that not all elements of the original state space $\mathcal{X}$ are independent, and thus not all elements of $\mathcal{X}$ will be considered to represent nodes.

In an example, a state of the tractor-trailer 100, i.e., $(x,y,\theta_0)$, is treated as independent state variables, while the other state variables related to the trailers 105A-105C, i.e., $(\xi_4, \xi_5, \xi_6)$, are assumed dependent on each other. As a result, all independent state variables, a portion of $\mathcal{X}=(x, y,\theta_0, \xi_4, \xi_5, \xi_6)$, form a reduced state space.

In an example, certain algebraic constraints are introduced to confine the trailer state $(\xi_4, \xi_5, \xi_6)$. For example, the algebraic constraints admit the form of $g(\xi_4, \xi_5, \xi_6)=0$. The reduced state space may be denoted as $\bar{\mathcal{X}}$: $\mathcal{X}$ X∈

$\mathcal{X}$ $|g(\xi_4, \xi_5, \xi_6)=0\}$. In this regard, as more algebraic constraints are introduced, the lower dimension of the resultant reduced state space reduces. For example, if $(\xi_4, \xi_5, \xi_5)$ is subject to one algebraic constraint, i.e., $g(\xi_4, \xi_5, \xi_6)$ is a scalar function, then $\xi_6$ may be represented as a function of $\xi_4, \xi_5$. Thus, the reduced state space is represented by $(x, y, \theta_0, \xi_4, \xi_5)$ and $\xi_6(\xi_4, \xi_5, \xi_6)$. In another example, $(\xi_4, \xi_5, \xi_6)$ is subject to two algebraic constraints, where $g(\xi_4, \xi_5, \xi_6)$ is a vector of two scalar functions. Then $\xi_5$, $\xi_6$ can be represented as functions of $\xi_4$. The reduced state space is represented by $\bar{X}=(x,y,\theta_0, \xi_4)$ and $\xi_5(\xi_4)$, $\xi_6(\xi_4)$, which has 4 dimensions.

In accordance with an embodiment, algebraic constraints $g(\xi_4, \xi_5, \xi_6)$ may be defined based on the kinematics or dynamics of the tractor-trailer 100. The further the trailer 105A-105C is away from the tractor 101, the more difficult it is to change its heading. The algebraic constraints $g(\xi_4, \xi_5, \xi_6)=0$ may restrict the poses of the trailers 105A-105C to those preferred in practice. The algebraic constraints may be chosen to ensure that the resultant poses of the trailers 105A-105C are preferable in practice and easy to reach with relative short maneuvers from other poses.

Figure 3A:
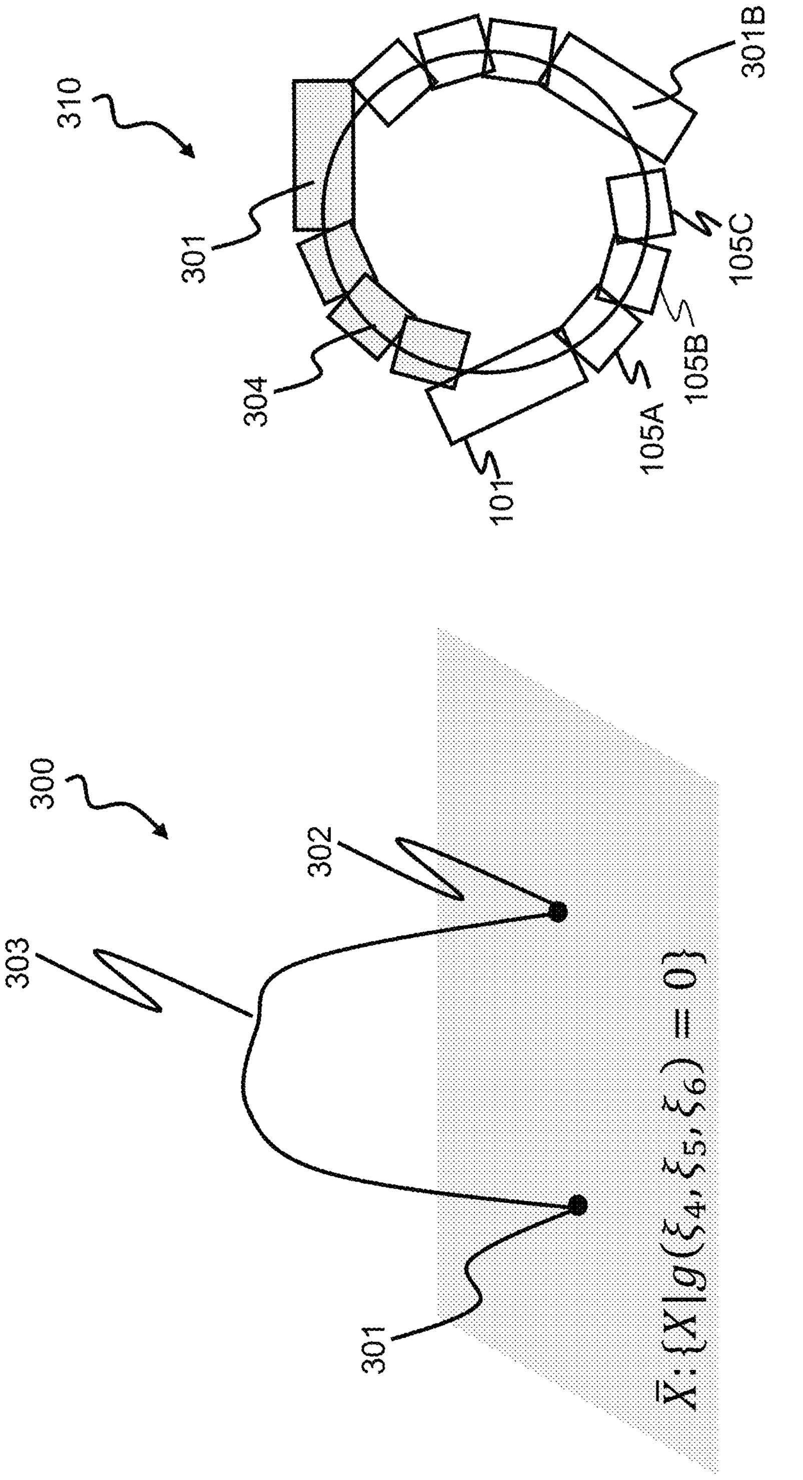
FIG. 3A shows an example schematic diagram of a reduced-dimensional state space, in accordance with an embodiment of the present disclosure.

FIG. 3A shows an example schematic diagram of a reduced-dimensional state space, in accordance with an embodiment. There is shown a plot 300 for path planning on a reduced state space $\bar{\mathcal{X}}$, while the path 125 remains on an original state space $\mathcal{X}$. In an example, the path/motion planning module 212 may identify or determine intermediate milestone states 301 and 302 in $\bar{\mathcal{X}}$, whereas a transition path/motion 303 between the intermediate milestone states 301 and 302 leaves the reduced state space $\bar{\mathcal{X}}$.

Further, a plot 310 may illustrate a choice of algebraic constraints that may restrict a state $X$ of the tractor-trailer 100 so that the tractor 101 and trailers 105A-105C may move in circles. To move in circles, the trailers 105A-105C and the tractor 101 may have to have a same yaw rate C, which implies the following expression of algebraic constraints:

$$g(\xi_4, \xi_5, \xi_6) = \begin{pmatrix} \dot{\xi}_4 \\ \dot{\xi}_5 \\ \dot{\xi}_6 \end{pmatrix}. \tag{5}$$

Given v, the yaw rate of the tractor 101 and the headings of all trailers 105A-105C are uniquely determined by a (normalized) steering angle s. In particular, for tractor 101, $\dot{\theta}_0=vs/R=C(s)$, the algebraic constraints admit the unique solution as:

$$\begin{aligned} \xi_4(s) &= -\arcsin\left(\frac{sd_1}{R}\right) \\ \xi_5(s) &= -\arcsin\left(\frac{sd_2}{Rc_1}\right) = \xi_5(\xi_4) \\ \xi_6(s) &= -\arcsin\left(\frac{sd_3}{Rc_1c_2}\right) = \xi_6(\xi_4), \end{aligned} \tag{6}$$

where $c_1=\sqrt{1-(sd_1/R)^2}$, $c_2=\sqrt{1-(sd_2/(Rc_1))^2}$. Hence the reduced state space may be represented by a state $\bar{X}=(x, y, \theta_0, \xi_4(s))^{\perp}$. Such constraints may give $\bar{\mathcal{X}} \subset \mathbb{R}^4$. Each element in $\bar{\mathcal{X}} \subset \mathbb{R}^4$ may represent a reduced state where all tractor 101 and trailers 105A-105C move in circles with certain radius and certain tractor configuration $(x, y, \theta_0)$. For example, 301 and 301B may denote two reduced states with the same $\xi_4$ but different $(x, y, \theta_0)$. The circle 304 in the plot 310 may represent the loci of (x, y) with the same $\xi_4$. For sake of brevity, the drawing of circles of the trailers 105A-105C are omitted.

Figure 3B:
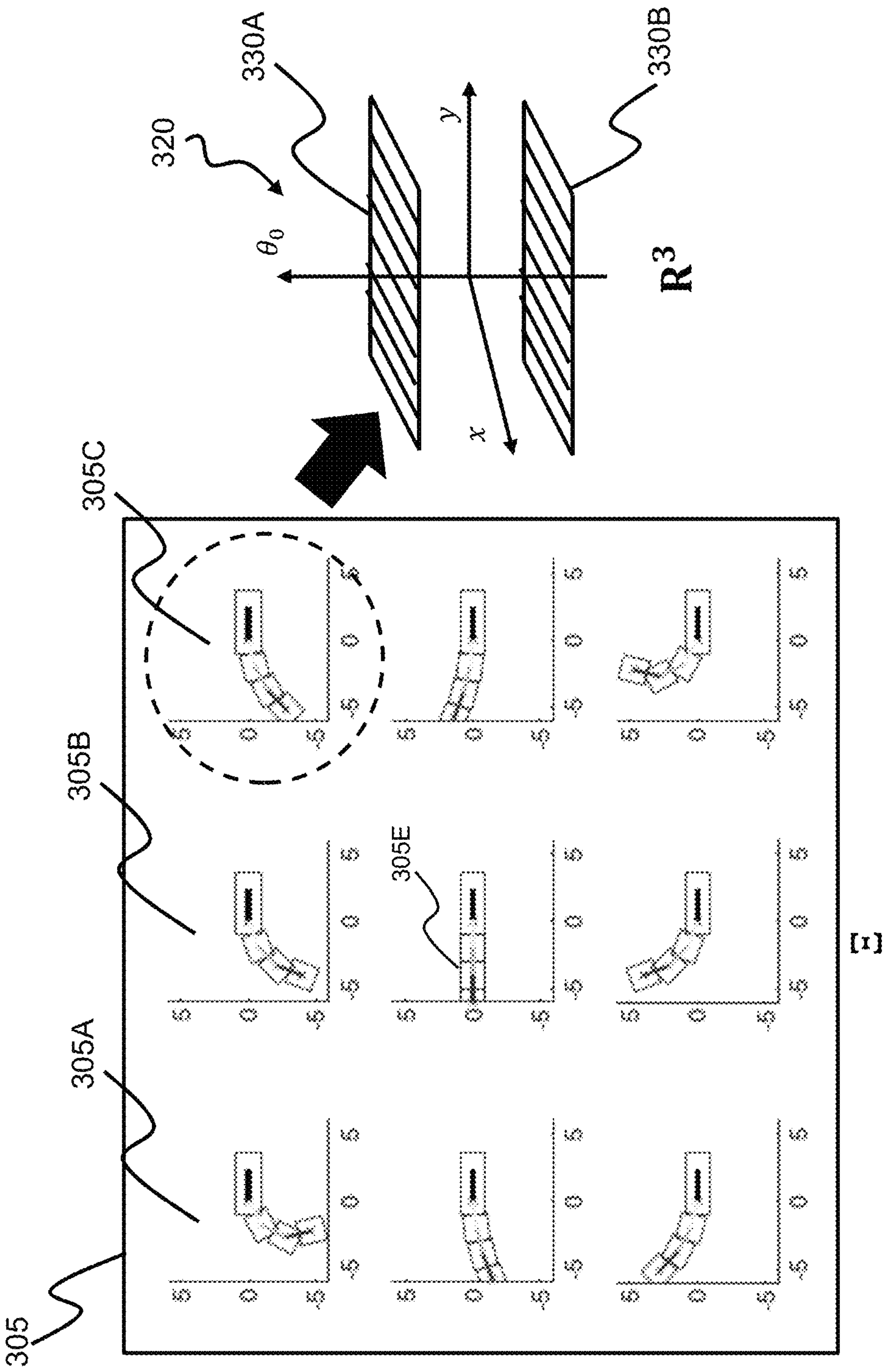
FIG. 3B shows another example schematic diagram of reduced-dimensional state space, in accordance with an embodiment of the present disclosure.

FIG. 3B shows another example schematic diagram of reduced-dimensional state space, in accordance with an embodiment. In accordance with an embodiment, a possible trailer configuration under reduced stated space constraints $g(\xi_4, \xi_5, \xi_6)=0$ may be determined based on a pseudo-trailer-configuration characterized by $\xi_4$ as an example. In particular, the pseudo-trailer-configuration induced initial state may have a tractor configuration: $(x, y, \theta_0)$ being zero and certain value of $\xi_4$. For instance, the constraint, for example, g constraint gives pseudo-trailer-configuration induced initial state in the form of $\bar{X}_{ptc}=(0,0,0,\xi_4)^{\perp}$, when $g(\xi_4, \xi_5, \xi_6)$ represents a vector of two scalar independent functions.

In accordance with an embodiment, the dimension reduction is achieved by approximating the trailer state space $(\xi_4, \xi_5, \xi_6)$ into a finite set $\Xi$, by sampling or discretizing the feasible domain of $(\xi_4, \xi_5, \xi_6)$. Any element of the set $\Xi$ represents a preferred pose of trailers, according to human drivers' knowledge. For example, based on the realization that from $\xi_4, \xi_5, \xi_6$, the difficulty of controlling them toward certain values is increasingly difficult, and thus it makes sense to choose preferred poses satisfying $\xi_4 \geq \xi_5 \geq \xi_6 \geq 0$ or $\xi_4 \leq \xi_5 \leq \xi_6 \leq 0$ during discretization. The resultant reduced state space is represented as $\mathbb{R}^3 \times \Xi$ and the path planning may occur over the reduced state space $\mathbb{R}^3 \times \Xi$.

In an example, a reduced state space may be represented as $\mathbb{R}^3 \times \Xi$, where $\Xi$ defines various preferred poses of the trailers 105A-105C. In an example, there may be nine preferred poses, as depicted in FIG. 3B. Each of the nine poses (collectively depicted as 305) may correspond to a pseudo-trailer-configuration induced initial state $\bar{X}_{ptc}=(0,0,0,\xi_4)^{\perp}$ with a certain $\xi_4 \in \Xi$. The fact that $\bar{X}_{ptc}$ being 4-dim implies that $\xi_5$, $\xi_6$ are dependent on $\xi_4$, i.e., their values can be inferred from the value of $\xi_4$. Particularly, a pose 305E represents a scenario that the headings of tractor 101 and the trailers 105A-105C are same, i.e., $\bar{X}_{ptc}=(0,0,0,0)^{\perp}$.

Moreover, a plot 320 represents a feasible domain of the tractor configuration: $(x, y, \theta_0)$, where x, y have a range $(-\infty, \infty)$ and $\theta_0$ has a range $[-\pi, \pi)$. Here 330A and 330B represent the planes $\theta_0=\pi$ and $\theta_0=-\pi$, respectively.

Figure 3C:
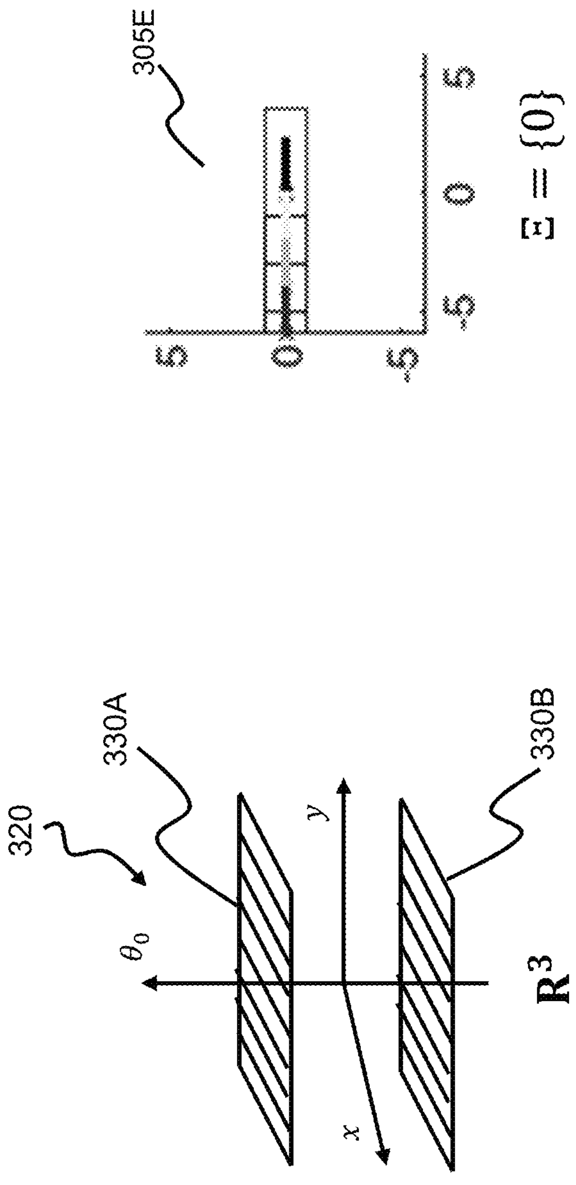
FIG. 3C shows yet another example schematic diagram of reduced-dimensional state space, in accordance with an embodiment of the present disclosure.

FIG. 3C shows yet another example schematic diagram of a reduced-dimensional state space, in accordance with an embodiment. In an example, the reduced state space may be represented as $\mathbb{R}^3 \times \Xi$, where $\Xi$ defines one preferred pose 305E of trailers. This choice of $\Xi$ reflects that the preferred pose of tractor-trailers is in a straight line.

In accordance with an embodiment, a reduce state $\bar{X}$ combined with algebraic constraints $g(\xi_4, \xi_5, \xi_6)$, uniquely determines an original state X in $\mathcal{X}$, i.e., $X(\bar{X})$ is well-defined. Hereinafter, when $\bar{X}$ is given, this disclosure implies the knowledge of X without further clarification.

It may be understood that planning of the path 125 over the reduced state space, i.e., constructing a graph (for example, a tree graph) where its nodes, or the intermediate milestone states, belong to $\mathbb{R}^3 \times \Xi$, is dominated by the computational burden of finding kinematic/dynamic admissible solutions between nodes and online tree construction efficiency to minimize the collision-check testing of kinematic/dynamic admissible solutions between nodes. In this regard, the kinematic/dynamic admissibility may be addressed offline by determining a set of MPs offline, and the online tree construction efficiency is highly dependent on node selection, mode selection, and collision-detection.

Continuing further, it may be time-consuming to construct a kinematic admissible solution between $\bar{X}_i$ and $\bar{X}_j$ by solving a steering problem (in order to address kinematic/dynamic admissibility of the path 125). In an example, the problem may require determination of a solution of the kinematic model over a finite time interval [0, $t_j$] with $X(0)=X_i$, $X(t_j)=X_j$, given the two states $X_i$ and $X_j$ of the kinematics and where $t_j$ is to be determined.

In certain cases, solving the steering problem for generating the motion primitives based on the dynamic model assumes two states with zero velocity and steering angle to ensure the continuity of states.

Subsequently, a set of MPs, denoted by $\mathcal{M}$, may be pre-computed to avoid dealing with the kinematics or dynamics of the tractor-trailer 100 during online path planning. An MP($\bar{X}_i$, $\bar{X}_j$) defines a kinematically admissible solution between a pair of states ($\bar{X}_i$, $\bar{X}_j$). As $X_i$, $X_j$ can be uniquely determined from $\bar{X}_i$, $\bar{X}_j$, respectively, MP($\bar{X}_1$, $\bar{X}_j$) may also define a kinematically admissible solution between a pair of states ($X_i$, $X_j$) $\in X$. As such, an MP represents a transition between two intermediate milestone states $\bar{X}_i$, $\bar{X}_j$. Typically, an MP has an initial or starting state being a certain pseudo-trailer-configuration induced state, i.e., $\bar{X}_i=\bar{X}_{ptc}=(0,0,0,\xi_4)$. That is: MP is parametrized by pseudo-trailer-configuration.

To this end, there exist infinite pairs ($\bar{X}_i$, $\bar{X}_j$)$\in\bar{X}$ of $\mathcal{M}$. Therefore, it may be impossible for $\mathcal{M}$ to include all possible MPs. It is practical to define $\mathcal{M}$ containing only a finite number of elements, which implies the finite number of $\bar{X}_i$, $\bar{X}_j$. Given $\bar{X}_i=\bar{X}_{ptc}=(0,0,0,\xi_4)$, it is important to select $\bar{X}_j$. In certain cases, a compact domain of the reduced state space $\bar{\mathcal{X}}$ may be discretized to obtain a finite set of states of the reduced state space (referred to as state lattice (SL), hereinafter) and let $\bar{X}_j$ belong to SL. In another embodiment, $\bar{X}_j$ can be obtained by randomly sampling the reduced state space.

Figure 4:
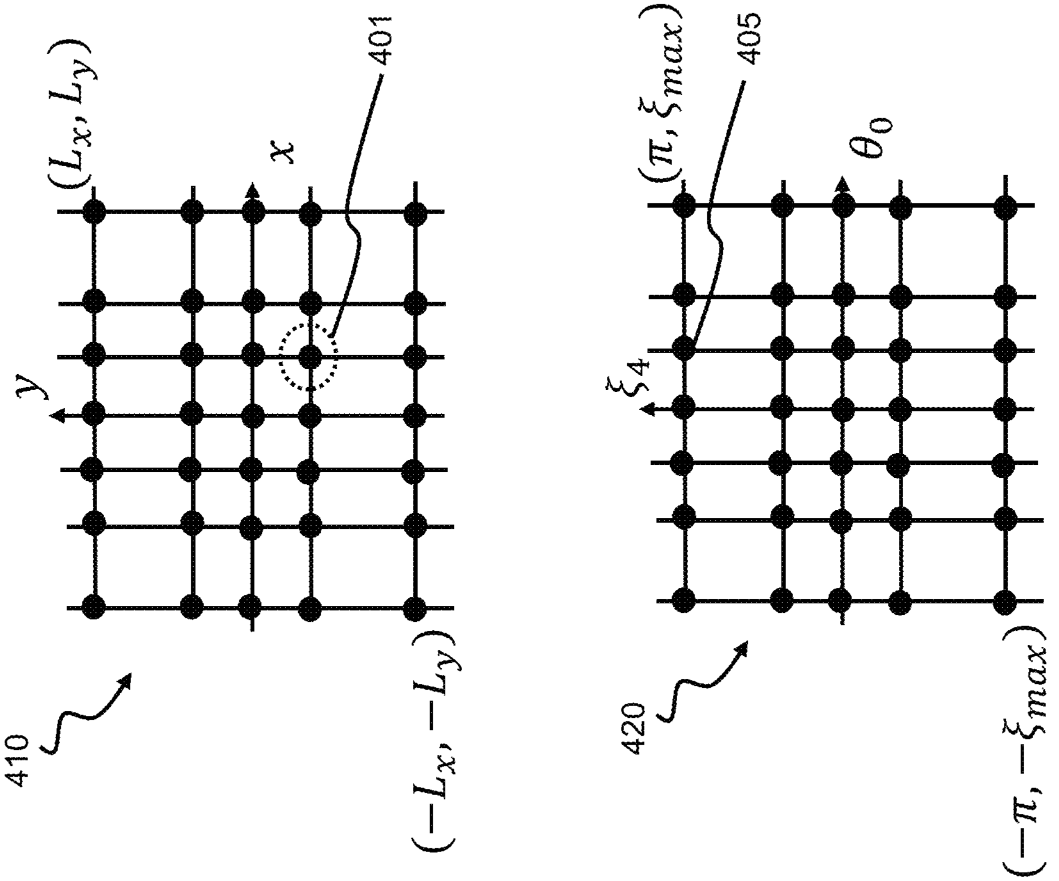
FIG. 4 illustrates an example schematic diagram of a state lattice, in accordance with an embodiment of the present disclosure.

FIG. 4 illustrates a schematic diagram of a state lattice, in accordance with an embodiment. The state lattice (SL) are obtained by discretizing a compact domain D1: $[-L_x, L_x]\times[-L_y, L_y]\times[-\pi, \pi]\times[-\xi_{max}, \xi_{max}]$ of a reduced state space $\bar{X}$ according to certain resolutions, where $L_x$, $L_y$, $\xi_{max}$ are pre-determined bounded constants. In this regard, a plot 410 shows a grid, denoted by a finite set $S_{xy}$, by discretizing $[-L_x, L_x]\times[-L_y, L_y]$ in the xy plane. For example, any black dot in $S_{xy}$, e.g. 401, corresponds to a state lattice by discretizing $[-L_x, L_x]\times[-L_y, L_y]$ in the xy plane.

Further, a plot 420 illustrates a compact domain D2: $[-\pi, \pi]\times[-\xi_{max}, \xi_{max}]$ in $\theta_0\xi_4$ plane 405 that is discretized to form a grid denoted by a finite set $S_{\theta_0\xi_4}$. Further, the SL is defined as the set $S_{xy}\times S_{\theta_0\xi_4}$.

In an example, a resolution of discretization corresponds to each dimension of the reduced state space that may be non-uniform. For example, along the x direction, the distances between any two adjacent discrete points over the interval $[-L_x, L_x]$ may be different.

Further, established planning over the SL, i.e., constructing a graph whose nodes belong to the SL, is very restrictive. Specifically, a chance of finding such a path 125 is greatly compromised, and a quality of a result path, if it exists, may not be desirable, because a feasible (or better) path 125 might not necessarily go through any state lattice. Therefore, it may be crucial to lift the limitation for restricting the nodes of a tree or a graph to the SL. This may be achieved by constructing a set of motion primitives, estimating of cost-to-go, and mode selection.

Figure 5A:
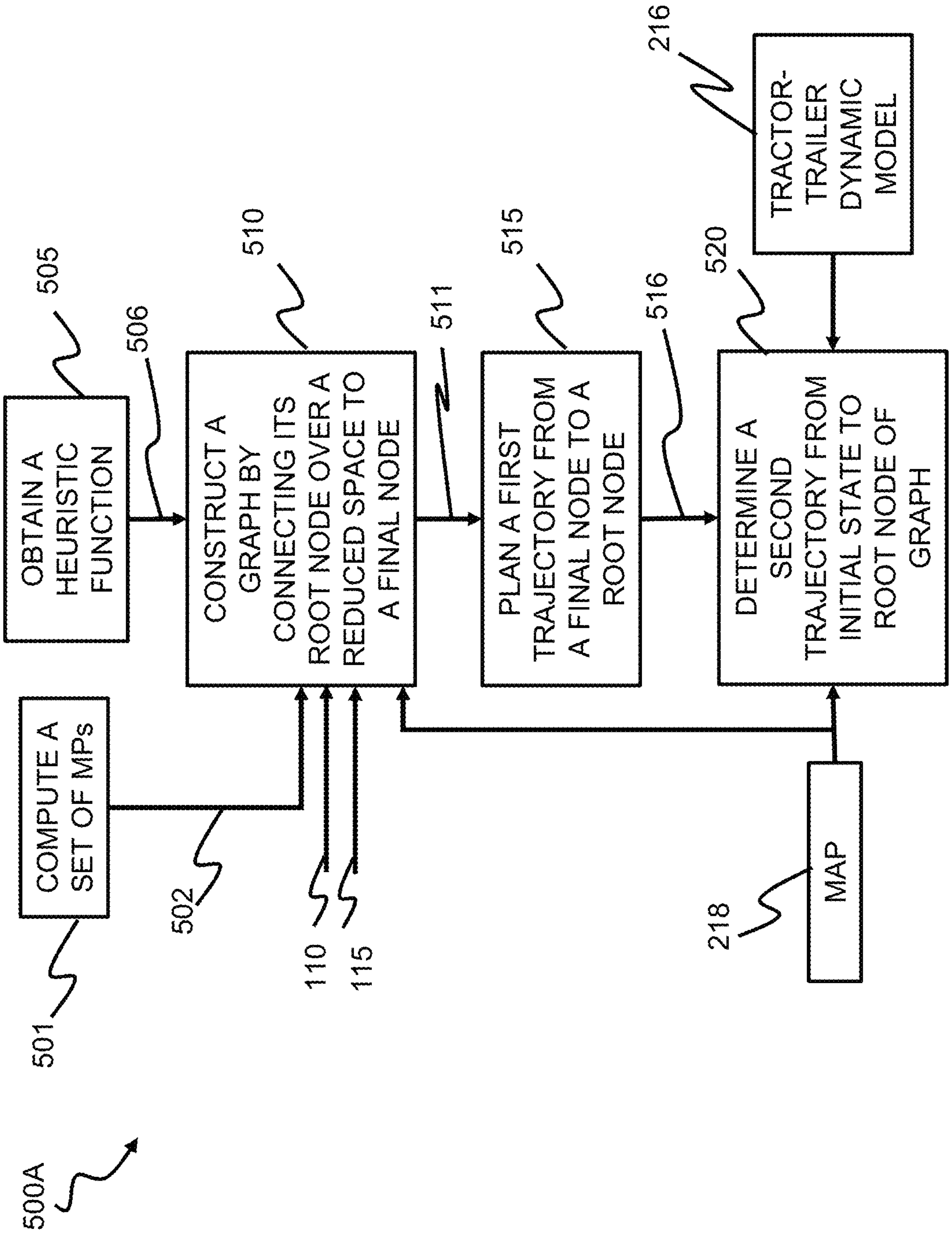
FIG. 5A shows a flowchart of a method for an off-lattice path/motion planning, in accordance with an embodiment of the present disclosure.

FIG. 5A shows a flowchart 500A of a method for an off-lattice path or motion planning, in accordance with an embodiment. At 501, a set of motion primitives (WPs, $\mathcal{M}$) may be computed offline. In an example, the control module 202 may collect the computed set of motion primitives. The set of MPs may be parameterized on a quantized pseudo-trailer-configuration from a finite set of quantized pseudo-trailer-configurations. In an example, each of the MP from the set of MPs is configured to move the tractor-trailer 100 from an initial state, such as the initial state 110, to a target state, such as the target state 115. In an example, the initial state 110 and the target state 115 are pseudo-trailer-configuration induced states and belong to the finite set of quantized pseudo-trailer-configurations. To this end, the initial state 110 and the target state 115 may have a same or different pseudo-trailer-configuration belonging to the finite set of quantized pseudo-trailer-configurations.

At 505, a heuristic function 506 is obtained offline for estimating a cost-to-go from a current or initial state to a target state. Further, each pair of nodes in the graph is connected with an edge defined by a collision-ignorant motion primitive from the collected set of MPs.

At 510, a graph is constructed to connect its root node, representing the target state 115, to a final node, possibly but not necessarily representing the initial state 110. The graph may be constructed through searching for a sequence of connected nodes (representing the intermediate milestone states and corresponding motion primitives) from the final node to the root node. In other words, the graph may be constructed by connecting a sequence of multiple motion primitives into a motion path connecting the final node (not necessarily initial state 110) with the target state 115. In an example, the graph may have multiple nodes defining states of the tractor-trailer 100 with tractor configurations being unrestricted to pre-defined real values, e.g. state lattice.

The nodes of the graph may include the final node defining the initial state 110 of the tractor-trailer 100 and the root node defining the target state 115 of the tractor-trailer 100. In the sequence of the graph, for example, a starting value of a quantized pseudo-trailer-configuration of a subsequent motion primitive may be equal to an ending value of a quantized pseudo-trailer-configuration of a previous motion primitive in the sequence. It may be noted that the nodes are not necessarily in the state lattice (SL), but may belong to the reduced state space 1. The transition between any two nodes on the path 125 is collision-free and kinematically admissible and is obtained by applying a particular MP from the set of MPs. The final node, not necessarily representing the initial state 110, lies inside a neighborhood of the goal node. In an example, the graph may be a tree graph.

At 515, a movement of the tractor-trailer 100 from the final node to the root node is obtained. Given the graph 511, a first trajectory 516 satisfies a certain dynamic model. For example, the first trajectory is constructed as profiles of acceleration a and steering angle s to satisfy the kinematic model and the velocity dynamics $\dot{v}=a$. The first trajectory 516 specifies movement of the tractor-trailer 100 from the final node to the root node of the graph. In some embodiments, off-lattice path/motion planning is achieved by constructing the graph with nodes belonging to the reduced state space $\mathbb{R}^3 \times \Xi$, where $\Xi$ is a finite set of interested values of $\xi_4$ as a result of discretizing a compact interval $[-\xi_{max}, \xi_{max}]$ along the dimension $\xi_4$.

At 520, a second trajectory is determined from the initial state to the root node of the graph. The second trajectory is determined based on the first trajectory 516, the map, the initial state 110, the target state 115, and the tractor-trailer dynamic model. The second trajectory may be determined from the initial state 110 to the root node of the graph. The second trajectory may correspond to a motion path. For example, based on the motion path, the motion of the tractor-trailer 100 may be controlled. In an example, a solution of an optimization problem, if found, is identified as the second trajectory ($X_k^*$, $U_k^*$), where k=1, . . . , N.

In some embodiments, off-lattice path/motion planning is achieved by constructing a tree or a graph with nodes belonging to the reduced state space $\mathbb{R}^3 \times \Xi$, where $\Xi$ is a finite set of interested values of $\xi_4$ as a result of discretizing a compact interval $[-\xi_{max}, \xi_{max}]$ along the dimension $\xi_4$. Some embodiments of this disclosure realize that the off-lattice motion planning requires a distinctive parameterization of MPs to construct the graph with nodes in $\mathbb{R}^3 \times \Xi$.

In certain cases, even though the goal node belongs to the reduced state space $\mathbb{R}^3 \times \Xi$, it is computationally prohibitive to construct the tree such that one node of the tree coincides with the goal node. Instead, it is sensible to stop the tree construction once a final node approaches closely enough to the goal node. In this manner, the second trajectory is determined from the initial state to a neighborhood of the first trajectory.

As such, there is a need to plan the second trajectory between the goal node or initial state and the root node, based on the first trajectory. Accordingly, the present disclosure discloses technique to determine the second trajectory. It may be noted that off-lattice path planning does not require the nodes to stay on the state lattice, and thus its motion primitives could take a more general parameterization to ensure that a path planning algorithm explores nodes belonging to the reduced state space. Particularly, some embodiments recognize that an off-lattice path planning aims to construct a graph where its nodes are not necessarily on the lattice. In other words, any motion primitive between $\bar{X}_i$ and $\bar{X}_j$, denoted by $MP(\bar{X}_i \rightarrow \bar{X}_j)$, could be a valid motion primitive for any reduced state whichever have the same pseudo-trailer configuration, e.g., $\xi_4$, as $\bar{X}_i$. Therefore, the motion primitives for off-lattice path planning may be parameterized on the pseudo-trailer-configuration (e.g., steering angle when the algebraic constraints confine the tractor and trailers have the same yaw rate.) only. In some embodiment, the pseudo-trailer-configuration can be $\xi_4$, while assuming $\xi_5$, $\xi_6$ are known functions of $\xi_4$. As described above, the set of MPs includes multiple motion primitives pre-calculated for each pseudo-trailer-configuration induced state, wherein a starting value of a quantized pseudo-trailer configuration belongs to the finite set of pseudo-trailer configurations.

In order to construct the MPs associated with a given value of the pseudo-trailer-configuration $\xi_4$, denoted by $MP(\xi_4)$ or $MP(\bar{X}_{ptc})$, various steering problems may be defined and solved for kinematically/dynamically admissible solutions from $\bar{X}_{ptc}=(0,0,0,\xi_4)$ to $\bar{X}_j=(x_j, y_j, \theta_{0,j}, \xi_{4,j})$ where $x_j$, $y_j$, $\theta_{0,j}$ are randomly drawn from the compact domain $\mathcal{D}_3$: $[-L_x, L_x]\times[-L_y, L_y]\times[-\pi, \pi]$, and $\xi_{4,j}$ belongs to the finite set of pseudo-trailer configurations $\Xi$. In another embodiment, $\bar{X}_j$ can be taken from the state lattice in FIG. 4. Note that an MP always starts from a pseudo-trailer-configuration induced initial state $\bar{X}_{ptc}$ with $x=y=\theta_0=0$. The MPs for any state $\bar{X}_i$ with the induced initial state $\bar{X}_{ptc}$ may include multiple motion primitives which move the trailer-based vehicle into different locations.

The set of motion primitives associated with a particular trailer configuration ideally should satisfy the following properties: 1) it facilitates the transition between reduced states with all possible pseudo-trailer-configurations; 2) the number of cusp that the motion primitive contains should not exceed a certain threshold (a cusp indicates a change of moving direction); 3) it ends up with nodes which maintain certain distance from each other; and 4) the length of motion primitive is practically reasonable.

Figure 5B:
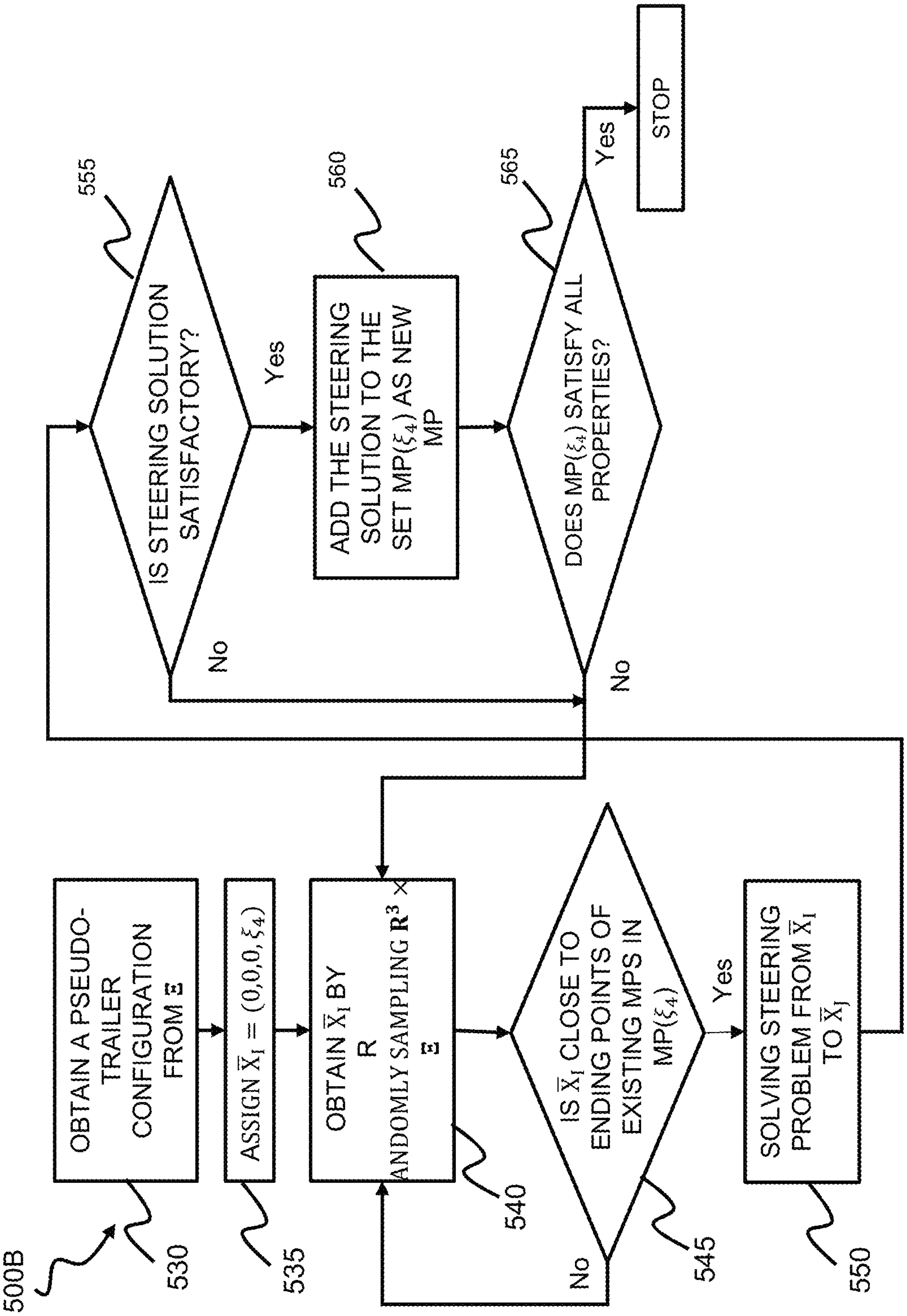
FIG. 5B a flowchart of an example method for generating motion primitives, in accordance with an embodiment of the present disclosure.

FIG. 5B illustrates a flowchart 500B of an example method for generating motion primitives with $\bar{X}_j$ being randomly drawn from the reduced state space, in accordance with an embodiment. The computation of $MP(\xi_4)$ is performed for a particular $\xi_4 \in \Xi$.

In accordance with an embodiment, the generating set of motion primitives may include quantizing a possible space of the pseudo-trailer-configuration to produce a finite set of values and pre-computing the motion primitives for each element of the finite set of pseudo-trailer-configurations. Thereafter, a set of motion primitives parameterized on quantized pseudo-trailer-configuration from a finite set of quantized pseudo-trailer-configuration may be collected or retrieved. Each motion primitive moves the tractor-trailer 100 from a pseudo-trailer-configuration induced initial state having a spatial configuration of the tractor-trailer 100 defined by a starting value of the quantized pseudo-trailer-configuration to another state (pseudo-trailer-configuration induced target state) having the same or different pseudo-trailer-configurations relating to the finite set of quantized pseudo-trailer-configurations defined by an ending value of the quantized pseudo-trailer-configuration.

In this regard, each motion primitive starts at a configuration of a tractor-trailer 100 governed by one pseudo-trailer-configuration in its finite set, wherein the initial state tractor configuration is (0, 0, 0). Further, each of the motion primitive ends in a configuration of the tractor-trailer 100 governed by one of the pseudo-trailer-configuration in the same finite set, wherein the tractor configuration has non-zero (x, y), and heading $\theta_0$. In such a manner, for a node with any of pseudo-trailer-configuration in the finite set, there are multiple pre-computed motion primitives that can be selected online. Thereafter, applying the selected motion primitive results in new nodes with pseudo-trailer-configuration staying in the finite set, and guarantees that the planning explores the reduced-dimensional state space spanned by the tractor configuration and the pseudo-trailer-configuration.

At 530, a pseudo-trailer-configuration is retrieved from the finite set of quantized pseudo-trailer-configurations $\Xi$.

At 535, pseudo-trailer-configuration induced initial state $\bar{X}_i=\bar{X}_{ptc}=(0,0,0,\xi_4)$ is assigned.

At 540, a random sample $\bar{X}_j$ is obtained.

At 545, the obtained random sample is evaluated whether it is of interest to solve an associated steering problem. In an example, the test is done based on determination whether $\bar{X}_j$ is close to ending points of existing MPs in $MP(\xi_4)$, or not.

If yes, at 550, the steering problem is solved. If the obtained sample at 545 is not of interest, a new random sample is drawn.

At 555, a determination is made if a steering solution obtained by solving the steering problem is feasible and satisfactory (e.g., the path length and the number of cusps of the path).

If it is feasible and satisfactory, at 560, the steering solution is added to MP($\xi_4$) as a new MP $\xi_4$ associated with the pseudo-trailer-configuration. If the steering solution is not feasible and satisfactory at 555, a new $\overline{X}_j$ is drawn for next iteration.

In an example embodiment, the pseudo-trailer-configuration may be represented by a steering angle δ or normalized steering angle steering angle s value. For example, δ may be independently controlled, and the new control variables are introduced as: $U=(v, s)^T=(\cos(\delta)v_f, (\tan(\delta)/\tan(\delta_{max})))^T$, where $\tan(\delta_{max})=L/R$, and $s\in[-1, 1]$ is a normalized steering angle. In particular, relative angles between headings of the trailers 105A-105C attached to the tractor 101 may be functions of steering angles 6. In another example embodiment, the pseudo-trailer-configuration may be represented by a relative angle between a heading $\theta_0$ of the tractor 101 and a heading of an adjacent trailer 105A attached to the tractor 101. For example, $\xi_4=\theta_1-\theta_0$, $\xi_5=\theta_2-\theta_1$, $\xi_6=\theta_3-\theta_2$ represent the relative angles between tractor 101 and adjacent trailers 105A-105C. In some embodiments, the maximum relative angle $\xi_{max}$ is less than $$\frac{\pi}{2}.$$

Therefore, the headings of the trailers 105A-C are functions of the pseudo-trailer-configuration.

At 565, once a set of MP($\xi_4$) satisfies all properties above, then the process 500B stops; otherwise, the flow returns to 540 and repeats the process.

As may be understood, to address feasibility issue of an on-lattice path planning, a large number of MPs are required to ensure such that the MPs facilitate the transition of a fine enough state lattice for accurate and successful path planning Conventionally, the MPs are lattice dependent, and thus the on-lattice planning approach requires a large set of MPs which is non-trivial to design and incurs a large memory.

In accordance with the embodiments of the present disclosure, the generation of the MPs is based on pseudo-trailer-configuration (or steering angles in some embodiments) only. This may enable use of a smaller set of MPs with similar or better planning success rate and yields better path quality. Such smaller set of MPs is also suitable for online and real-time path planning for trailer-based vehicles. On the other hand, the off-lattice path planning requires a distinctive method to estimate the cost-to-go of a node of the graph, because the node is not necessarily on the state lattice anymore, and instead belongs to the reduced state space.

Figure 6A:
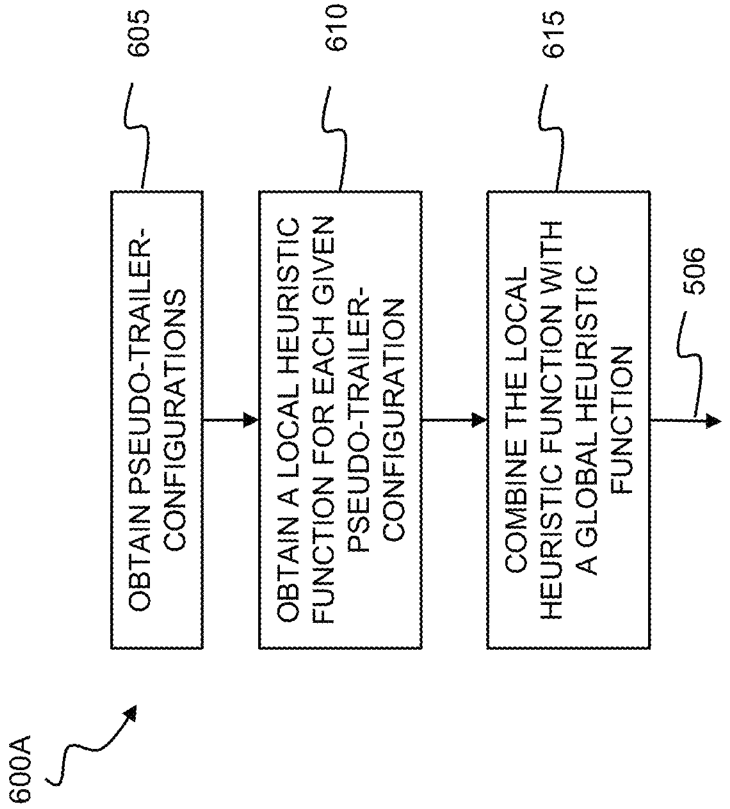
FIG. 6A shows a block diagram of a method for obtaining a heuristic function, in accordance with an embodiment of the present disclosure.

FIG. 6A illustrates a block diagram 600A of a method for obtaining a heuristic function, in accordance with an embodiment. It may be noted, the heuristic function estimates a cost-to-go or cost function associated with a node (or state) for the tractor-trailer system 100. Constructing the heuristic function to approximate the cost-to-go for the tractor-trailer 100 is challenging because of the complexity of the kinematic or dynamic model.

A cost-to-go is characterized by a continuous function $h(\mathcal{X}, \mathcal{X}_f)$, $\forall \mathcal{X}, \mathcal{X}_f \in \mathcal{X}$, the value of which is always positive real and indicates the cost of moving the tractor-trailer 100 from a state $\mathcal{X}$ to another state $\mathcal{X}_f$. The cost-to-go function $h(\cdot,\cdot)$ is related to the dynamics of the tractor-trailer 100 and obstacles, such as the obstacles 120, and thus is unknown. The cost-to-go for tractor-trailer 100 can only be estimated by a heuristic function.

Some embodiments of estimating the cost-to-go function is based on the realization that $h(\mathcal{X}, \mathcal{X}_f)$ is exactly the same as $h(\mathbf{T}_{\mathcal{X}_f}(\mathbf{T}_{\mathcal{X}_f}), \mathcal{X}(\mathcal{X}_f))$, where $\mathbf{T}_{\mathcal{X}_f}$ is an SE transformation such that $\mathbf{T}_{\mathcal{X}_f}(\mathcal{X}_f)$ has a tractor configuration being $(0,0,0)^{\perp}$ and the trailer configuration remains unchanged and $\mathbf{T}_{\mathcal{X}_f}(\mathcal{X})$ has the tractor configuration being a value relative to $X_f$ and the trailer configuration remains unchanged. Particularly, the SE transformation in the reduced state space is uniquely defined as follows $$T_{X_f}(X) = \begin{pmatrix} x\cos\theta_{0,f} + y\sin\theta_{0,f} - x_f \\ -x\sin\theta_{0,f} + y\cos\theta_{0,f} - y_f \\ \theta_0 - \theta_{0,f} \\ \xi_{4,f} \end{pmatrix}.$$

Note that the SE transformation $T_{X_f}$ also works in both the original state space and the reduced state space.

In accordance with an embodiment, a local heuristic function may be obtained or constructed for each pseudo-trailer-configuration induced state $\overline{X}_{ptc}$. which uniquely determines a state: $X_{ptc}$. Such a local heuristic function is only valid locally when $\overline{X}$ (inferred as X) is not far from $\overline{X}_f$ (inferred as $X_{ptc}$). In some embodiments, we are interested in approximating $h(X, X_f)$, where $X_f$ is enumerated through all possible values of $X_{ptc}$.

Some embodiments of estimating the cost-to-go function are based on the realization that $h(\overline{X}, \overline{X}_f)$ is exactly the same as $h(T_{X_f}(\overline{X}), T_{X_f}(\overline{X}_f))$.

In some embodiments of the present disclosure, the heuristic function has both arguments defined in the original state space, i.e., admitting the form of $\hat{h}(X_i, X_{ptc})$. In another embodiment, the heuristic function has both arguments defined in the reduced state space, i.e., admitting the form of $\hat{h}(\overline{X}_i, \overline{X}_{ptc})$.

Some embodiments of this disclosure are based on the realization that the computational efficiency of off-lattice motion planning methods disclosed herein is highly dependent on the estimation accuracy of the cost-to-go, which determines a right node to be selected for growing the graph.

In some embodiments, a node may be repetitively selected based on corresponding node cost, which represents a sum of arrival cost and estimated cost-to-go. The arrival cost is the cost of driving the tractor-trailer from the initial state to the node, and the estimated cost-to-go is the estimate of the cost of driving the tractor-trailer from the node to the target state. Further, motion primitives may be applied at the selected node based on corresponding pseudo-trailer-configuration to add new nodes (or child nodes). It may be noted, the new child nodes always have related pseudo-trailer-configurations belonging to a set of all possible values. Moreover, the tractor configuration (x,y) and heading may be arbitrary real values.

In some embodiments, a tree graph may be constructed with nodes in the reduced state space $\mathbb{R}^3\times\Xi$, which has a finite number of pseudo-trailer-configuration $\xi_4\in\Xi$. Because of the use of the SE transformation, only a total $|\Xi|$ heuristic functions may need to be constructed where each heuristic function has a second argument being a particular pseudo-trailer-configuration induced state. This argument is applicable to constructing heuristic functions depending on X. Because a distinctive heuristic function $\hat{h}(X, X_{ptc})$ is constructed for each $X_{ptc}$, in some embodiments, the second argument of the heuristic function can be omitted. That is: the heuristic function admits the form of $\hat{h}(X)$ or $\hat{h}(\overline{X})$.

Returning to present example, at 605, given pseudo-trailer configurations are obtained for constructing local heuristic functions. At 610, local heuristic functions corresponding to each of the pseudo-trailer-configuration induced states are obtained. At 615, the local heuristic functions are combined with a global heuristic function to provide an estimate of cost-to-go when $\bar{X}$ is beyond certain compact region.

Figure 6B:
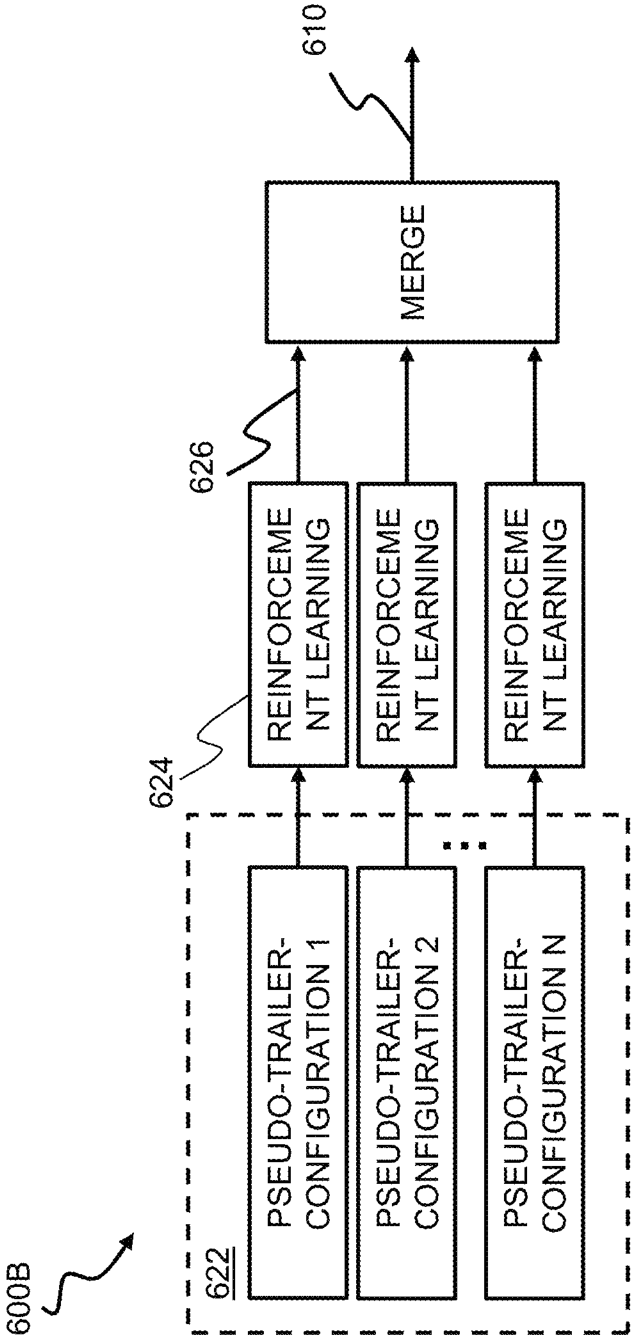
FIG. 6B shows a block diagram of an example system for obtaining a heuristic function through off-line heuristic training, in accordance with an embodiment of the present disclosure.

FIG. 6B shows a block diagram 600B of an example system for obtaining a heuristic function through off-line heuristic training, in accordance with an embodiment. In accordance with the present embodiment, the each of the pseudo-trailer-configurations 622 obtained is processed by a reinforcement learning (RL) module 624. In an example, nodes of the graph may be selected according to a cost of each of the selected nodes. For example, the cost of a node includes a cost of arrival and an estimated cost-to-go. In an example, the estimated cost-to-go may be determined by the heuristic function. In this regard, the estimated cost-to-go of each of the selected nodes may be calculated using a neural network. The neural network receives an input. For example, the input may have two states, i.e., initial state and target state, of the tractor-trailer 100 in one of an original state space or a reduced state space.

On the processing of the pseudo-trailer-configurations 622, a value function 626 for each pseudo-trailer-configuration 622 is obtained as result. The RL module 624 learns the value function 626 in free space (without obstacles) through, for example, a soft actor-critic (SAC) algorithm. The value functions 626 for all possible pseudo-trailer-configurations are merged to give the local heuristic function 610. In this manner, the local heuristic function is obtained at 610 of FIG. 6A.

Figure 6C:
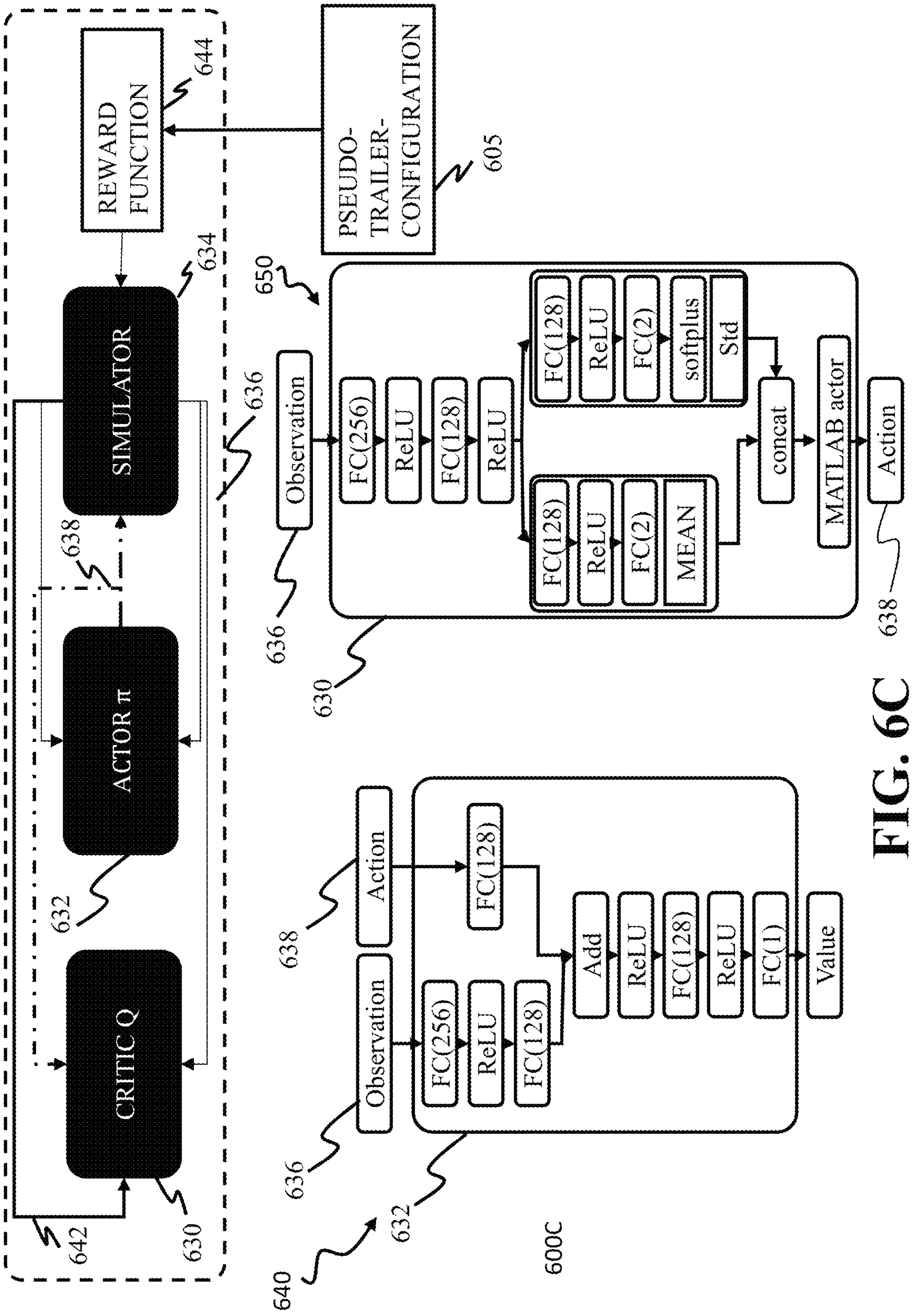
FIG. 6C shows a block diagram of an example system for obtaining a local heuristic function by Reinforcement Learning (RL), in accordance with an embodiment of the present disclosure.

FIG. 6C shows a block diagram 600C of an example system for obtaining a local heuristic function by Reinforcement Learning (RL), in accordance with an embodiment. The local heuristic function may be obtained based on determining a value function 626 for a particular pseudo-trailer-configuration. Given a pseudo-trailer-configuration $\xi_4 \in \Xi$ and an induced state $\bar{X}_{ptc}$, a reduced goal state for training takes the form of $$\bar{X}_{train,goal} = \bar{X}_{ptc}.$$

The training goal state may be obtained as $X_{train,goal} = X(\bar{X}_{train,goal})$. The RL may be configured to learn a navigation policy through an actor 632, and Q value function through a critic 630, simultaneously. Moreover, a tractor-trailer state 636 is randomly initialized as X(0) in the simulator 634. The actor 632, implementing the navigation policy, determines an action u 638 based on the tractor-trailer state 636 and commands the simulator 634 to execute the action u 638.

The simulator 634 obtains a numerical solution X(k) of an initial value problem of a kinematic model for a given action 638 and an initial condition X(0), which is randomly initialized. Here k denotes the time step. The simulated result after each initialization is called an "episode". Finally, the critic 630 trains the value function 640 based on u 638, X(k) 636, and reward 642.

Further, there is shown a network structure 640 of the actor 632, and a network structure 650 of the critic 630, by the two plots in the FIG. 6B. Herein, the observation 636 refers to the current state X(k) and action 638 refers to the current input u generated by the actor 632. "FC(n)" refers to a fully connected layer with output size n. "Add" refers to an addition layer, which adds inputs from multiple neural network layers elementwise. The "softplus" layer applies a softplus activation function, which ensures the positiveness of outputs. The "concat" refers to the concatenation layer, which takes inputs and concatenates them along a specified dimension. Reward 642 is given when the tractor-trailer 100 is close to a goal pseudo-trailer-configuration 605. Each episode terminates if any of the following condition is met: 1) when the maximum steps per episode MaxSteps is reached; 2) when the trailer goes out of a 35[m]×35 [m] window centred at the goal; 3) when the trailer runs into a jack-knife configuration. For example, a jack-knife configuration means any relative angle between the tractor and trailers is greater than 90 degrees. For example, $\xi_4 = \theta_1 - \theta_0$, $\xi_5 = \theta_2 - 1$, $\xi_6 = \theta_3 - \theta_2$ represent the relative angles between adjacent tractor and trailers. The parameters in the networks will be updated after every several episodes according to the reward 642 obtained.

The design of a reward function 644 and the training process are crucial for the performance of the trained policy. The two objectives of the reward function 644 are: encouraging the tractor-trailer 100 to go to $X_{train,goal}$ as quickly as possible; and not discouraging exploration of the complicated tractor-trailer 100 kinematics and control policy.

In accordance with an embodiment, the sparse reward function 644 may be used in the RL training. While MaxSteps, a large but finite positive integer, is not reached, the reward 642 at time k with observation X(k) is:

$$r(X(k)) = \begin{cases} 1 & \text{if } \|X(k) - X_{train,goal}\|_{W_1} \leq \epsilon \\ 0 & \text{otherwise} \end{cases},$$

where $W_1 = \text{diag}([4.83, 4.25, 0.33, 0.15, 0.07, 0.03])$ is a weight matrix and $\epsilon$ determines a size of the "goal region". Since the reward 642 is sparse, it is hard to receive reward 642 at the beginning episodes if $\epsilon$ is too small. Therefore, the training may start with $\epsilon = 1$ until an average reward of ten latest episodes converges. Thereafter, $\epsilon$ may shrink to half of its previous value, and the training process is repeated until $\epsilon = 0.25$.

To obtain the estimated cost-to-go from the learned critic value function 630 we use a zero vector for the action 630 input and use the resulting critic value function to estimate a cost-to-go given a state X. The value functions given different pseudo-trailer-configurations may merge to give the local heuristic function 610.

Figure 6D:
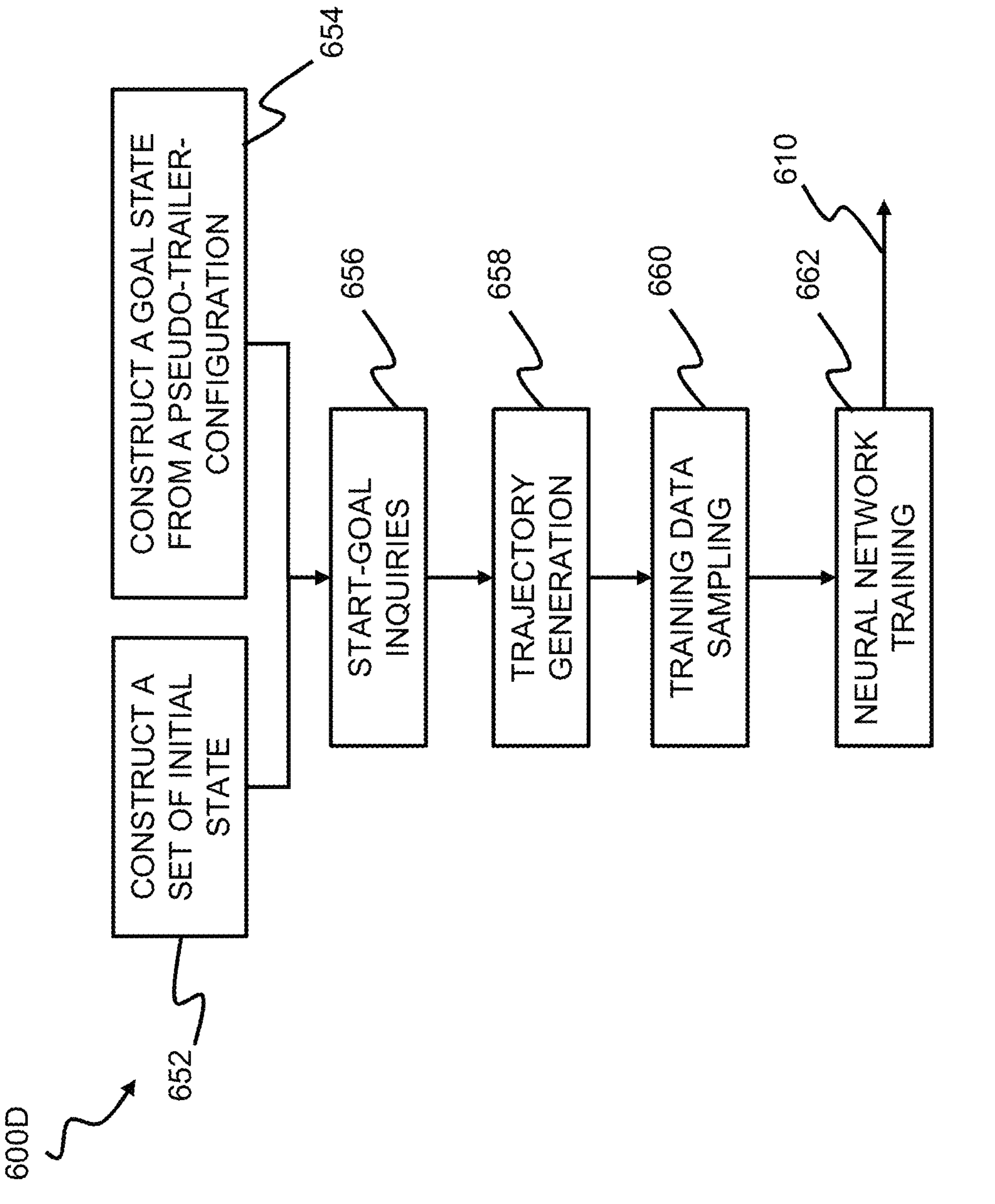
FIG. 6D shows a block diagram of a method for obtaining the heuristic function by supervised learning, in accordance with an embodiment of the present disclosure.

FIG. 6D shows a block diagram 600D of a method for obtaining a local heuristic function by supervised learning, in accordance with an embodiment. In an example, neural network models may be employed for function approximation. For supervised learning, at first, the training data is generated. Then, a neural network structure is defined. The neural network may be trained using the training data and standard algorithms, such as Bayesian Regression.

At 652, a set of initial state is constructed. The set of initial state may include n pre-selected states $X \in \mathbb{R}^6$ of the tractor-trailer 100. The states are sampled from a given compact region $\mathbb{R}$ and the ith element of the set of initial state is denoted as $X_i$, i=1, . . . , n.

At 654, a goal state $X_{ptc}$ is constructed from a particular pseudo-trailer-configuration induced state $\bar{X}_{ptc}$.

At 656, start-goal pair inquiries are started. In this regard, the neural network may enumerate and fetch one start-goal pair $(X_i, X_{ptc})$, i=1, . . . , n. In an example, a steering problem, driving the tractor-trailer 100 from $X_i$ to $X_{ptc}$, is defined for each start-goal pair. In this manner a number of different steering problems may be generated corresponding to different values of pseudo-trailer-configuration.

At 658, a numerical optimal control solver solves the steering problems for all possible start-goal pairs and outputs result trajectories. In this manner, trajectories for the tractor-trailer may be generated. Each trajectory may contain a number of data points and each data point is given by (X, h), where h is the cost-to-go from X to $X_{ptc}$.

At 660, some of the data points from each of the trajectories may be sampled.

Based on the sampled data points from all trajectories, at 662, the neural network may be trained. The sampled data points may include the training data $(X,h)_i$, i=1, . . . , m. In an example, the training process involves minimizing a mean-square-error between a prediction of a value for h by the neural network and a true h. The goal of the neural network is to predict the cost-to-go h corresponding to X. The trained neural network is saved as the heuristic function 610 for a particular $X_{ptc}$. For example, a finite number of neural networks may be used to estimate the cost-to-go. Each neural network may have a different pseudo-trailer-configuration induced state as its goal state.

It may be noted that the aforementioned steps may be repeated for another goal state corresponding to a new pseudo-trailer-configuration induced state $\bar{X}_{ptc}$ until the neural networks for all pseudo-trailer-configuration induced states have been trained for and the corresponding heuristic functions have been obtained. In an example, the heuristic function obtained at 610 includes various trained neural networks representing all heuristic functions corresponding to all pseudo-trailer-configurations.

Figure 6E:
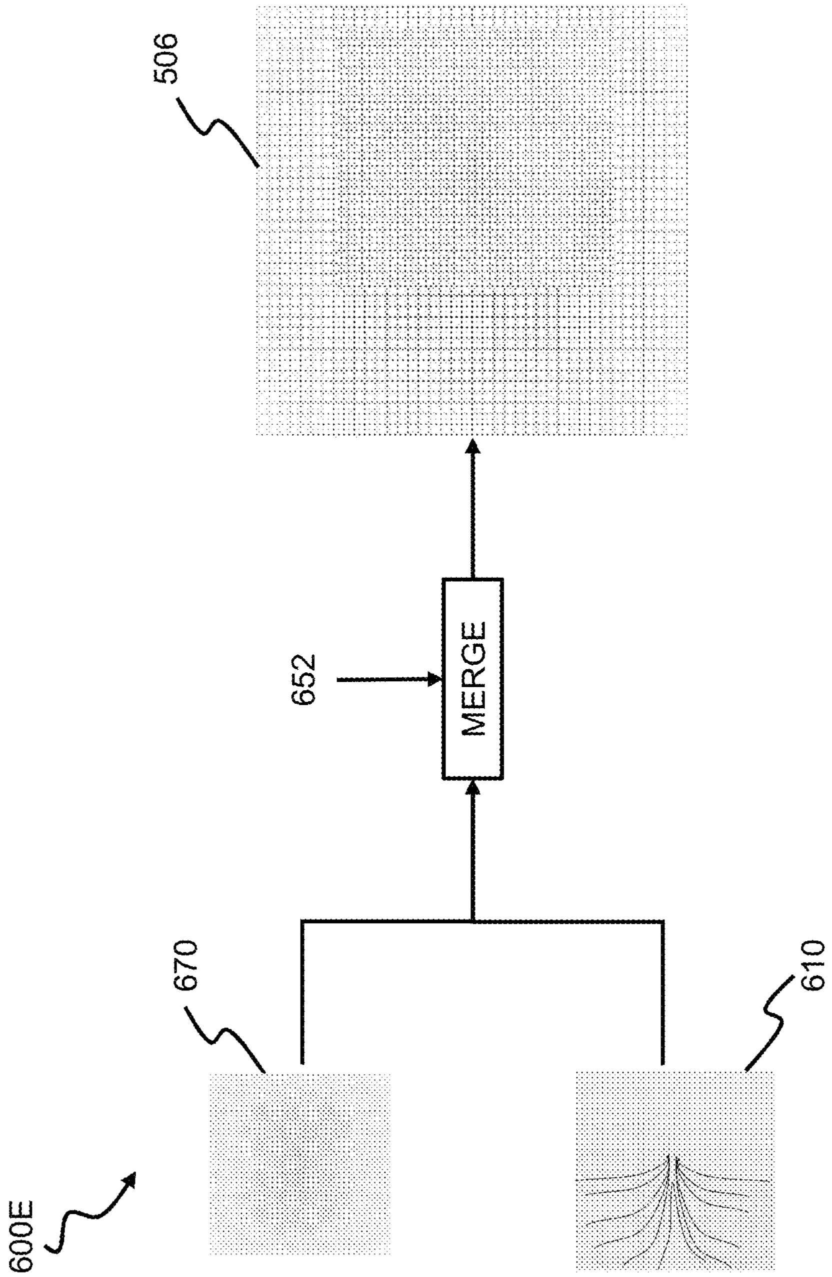
FIG. 6E illustrates a schematic diagram of combining the local heuristic function and a global heuristic function, in accordance with an embodiment of the present disclosure.

FIG. 6E illustrates a schematic diagram 600E of combining the local heuristic function 610 and a global heuristic function 670, in accordance with an embodiment. It may be noted that the local heuristic function 610 generally only works with states (or likely works inside the region where training data are abundant) that are visited during the training process, therefore, it is only considered as a local heuristic function. To this end, to get a globally defined heuristic function, the local heuristic function 610 may have to be combined with a global heuristic function 670.

As shown in FIG. 6E, a final heuristic function 506 is a weighted sum, as an example, of the local heuristic function 610 and global heuristic function 670 given the weight 652. It may be noted, the final heuristic function 506 is obtained in the original state space $\mathcal{X}$ . Since the SE transformation $T_{X_f}$ also works in the original state space, the desired cost-to-go function $h(T_{X_f}(\bar{X}), T_{X_f}(\bar{X}_f))$ in the reduced state space $\bar{\mathcal{X}}$ is captured by the final heuristic function 506, which has the form h $(T_{X_f}(X), T_{X_f}(X_f))$.

To this end, the final heuristic function 506 for off-lattice exploration for path planning is defined over all states of the original or reduced state space, and not over state lattice. As a result, the final heuristic function 506 accurately estimates a true value of cost-to-go from a state to a goal state for tractor-trailer in more sophisticated and accurate manner to maintain real-time performance. The final heuristic function 506 may learn cost-to-go or maneuver costs of the trailer kinematics by reinforcement learning or supervised learning and may use the learned value function to obtain heuristic value. Moreover, as heuristic look-up table (HLUT) may not be required for estimating the cost-to-go or heuristic value, thus, memory burden of the control system may be reduced.

Figure 7A:
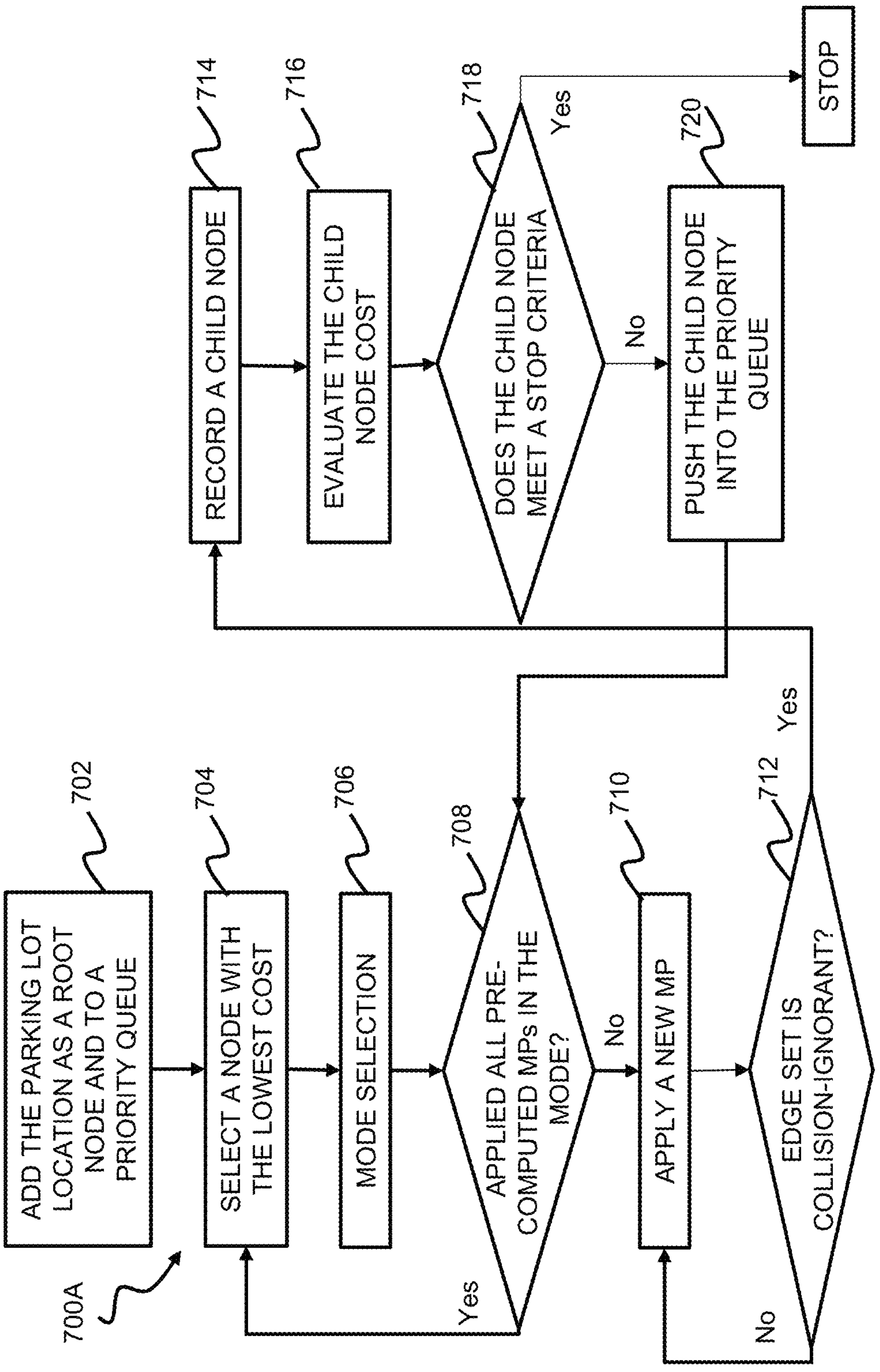
FIG. 7A shows a flowchart of a method for constructing a graph over a reduced state space, in accordance with an embodiment of the present disclosure.

FIG. 7A shows a flowchart 700A of a method for constructing a graph over a reduced state space, in accordance with an embodiment. In an example, the graph is a tree-graph (referred to as tree, hereinafter).

In one embodiment, a tree $\mathcal{T}=(\mathcal{V}, \varepsilon)$ may be composed of a node set $\mathcal{V} \subset \mathcal{C}_{free}$ free and an edge set $\in$. Herein, any element of $\mathcal{V}$ belongs to $\bar{X}$, and $E(\bar{X}_i, \bar{X}_j) \in \varepsilon$ represents a kinematically or dynamically feasible transition between $\bar{X}_i$ and $\bar{X}_j$. Moreover, $\mathcal{C}_{free}$, represents all possible reduced states where the tractor-trailer 100 does not overlap any obstacles 120 in an environment, such as the environment 150, and 208.

At 702, the construction of the tree begins with adding a reduced state corresponding to a parking lot location 115 (target location or target state) as a root node of the tree. The root node of the tree may be pushed into a priority queue, and the reduced state corresponding to an initial state or current location 110 may be added as a goal node. In this regard, $MP(\xi_4)$ may be denoted as a set of MPs associated to the class of reduced states with a certain pseudo-trailer configuration characterized by $\xi_4 \in \Xi$.

At 704, a node $\bar{X}_i$ with a lowest cost is selected from the priority queue.

At 706, a mode selection function determines a best mode for expanding the node $\bar{X}_i$ At 708, a determination is made as to whether all MPs belonging to the selected mode of $MP(\xi_4)$ are applied. If yes, then the flow returns to node selection 704. If not all MPs belonging to the selected mode of $MP(\xi_4)$ are applied, a new MP which has not be applied is retrieved and applied, at 710 at $\bar{X}_i$ which gives a short path $\mathcal{P}_{ij}$.

At 712, another determination is made to check if the resultant path $\mathcal{P}_{ij}$ is collision-ignorant and ends at a new node $\bar{X}_j$ It may also be checked if the resultant path $\mathcal{P}_{ij}$ is not only collision-ignorant but also new node $\bar{X}_j$ is certain distant away from the rest of the nodes on the tree.

Based on the determination that the resultant path $\mathcal{P}_{ij}$ is collision-ignorant and feasible, at 714, $\bar{X}_j$ is recorded as a new child node.

Thereafter, at 716, cost of the new child node $\bar{X}_j$ is evaluated sequentially.

At 718, a determination is made to check if the child node satisfies a stop criteria. In an example, the stop criteria may be entering a neighborhood of the goal node corresponding to the current location 110. If the stop criteria is satisfied, the tree construction stops, and the child node is deemed as the final node.

If the stop criteria is not satisfied, the child node is pushed into the priority queue, at 720, and the flow returns to 708.

The process of selecting the best node, selecting the best mode, expanding the best node by applying MPs in the selected mode of $MP(\xi_4)$, checking whether the resultant short path is collision-ignorant, evaluating the cost of new child nodes, and pushing new collision-free child node into the priority queue, stops if a new child node enters a neighborhood of the goal node. During the node selection 704, the nodes whose associated MPs have been applied will be removed from the priority queue.

In some embodiments, the priority queue is ordered according to the cost of node $\bar{X}$, which represents the potential cost of a path connecting the root node and the goal node while passing through the node $\bar{X}$. In one embodiment, the node cost function $\mathcal{F}(\cdot)$ sums up a heuristic value $\hat{h}(\cdot)$, by submitting $\bar{X}$ (or related X) and the goal node to the heuristic function 506, and an arrival cost $g(\cdot)$. The arrival cost $g(\overline{X})$ is the sum of the arrival cost of the parent of $\overline{X}$ and the cost of executing the MP to move the vehicle from its parent to $\overline{X}$.

Figure 7B:
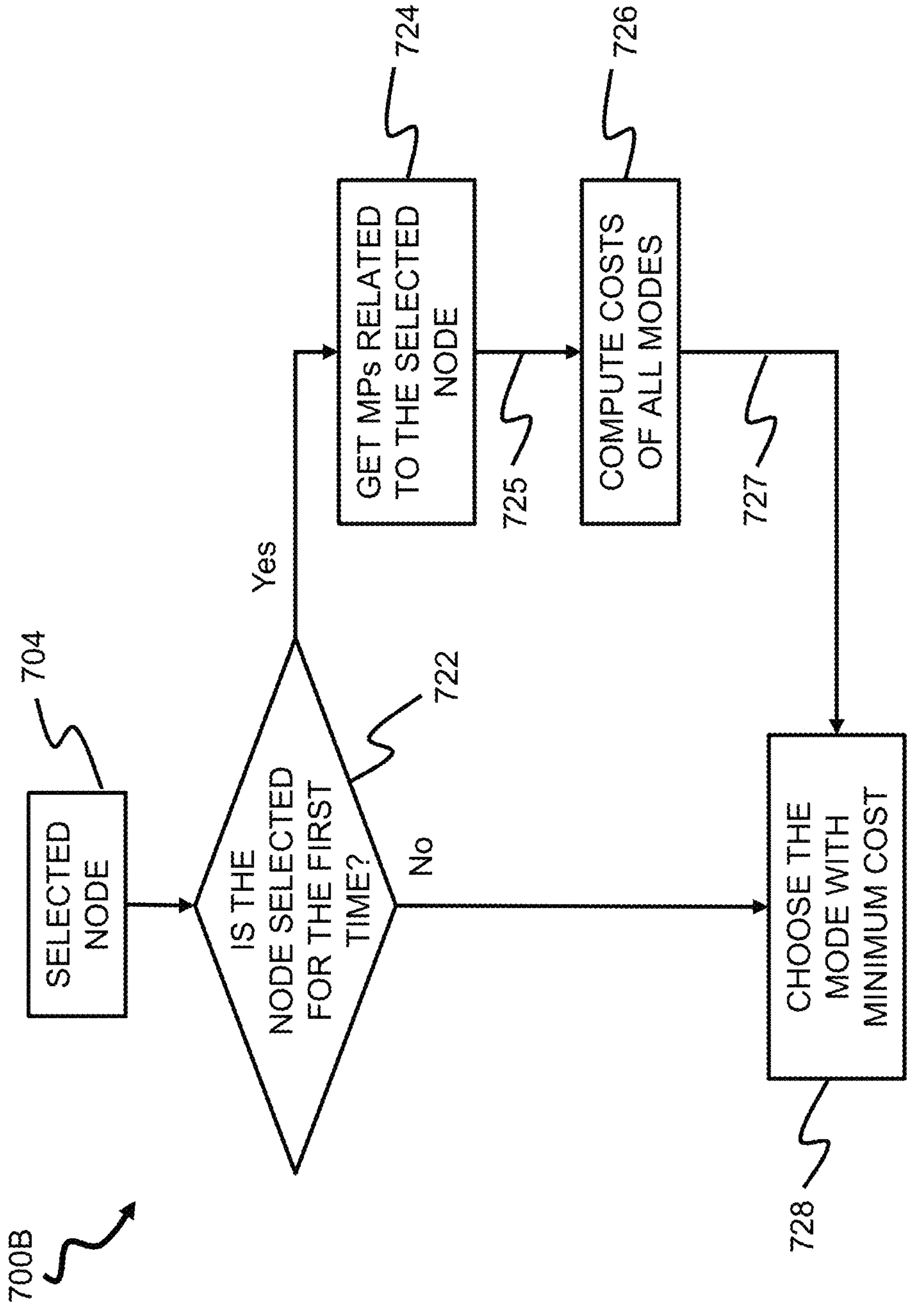
FIG. 7B shows a flowchart of a method for mode selection, in accordance with an embodiment of the present disclosure.

FIG. 7B shows a flowchart 700B of a method for mode selection, in accordance with an embodiment. At 722, given a selected node $\overline{X}_s$ from 704, a test is performed to check if it the selected node is selected for the first time.

If yes, at 724 all the MPs corresponding to $\ddot{X}_s$ are retrieved. Herein, 725 may represent the selected node $\overline{X}_s$ and all related MPs. In an example, the MPs may be categorized into several modes of smaller groups of MPs. In an embodiment, the classification of the MPs into different modes is performed based on backward right, backward left, forward right, and forward left.

At 726, costs of all modes are computed. First, all the child nodes of $\overline{X}_s$ are identified by applying the MPs. Thereafter, the heuristic function 506 is used to compute heuristic cost of each of the children nodes. The cost associated with one MP, $c_j$, is a sum of the cost of the MP itself and the heuristic cost of the corresponding child node. In this manner, all costs associate with each of the MPs are computed. Moreover, the cost for each mode is computed. In some embodiments, the cost of a mode is an average cost of all the $c_i$ of MPs that belong to the mode. Herein, 727 represents the cost of all modes of MPs for $\overline{X}_s$.

At 728, a mode with minimum cost is selected, and the MPs in this mode will be expanded first.

Figure 8A:
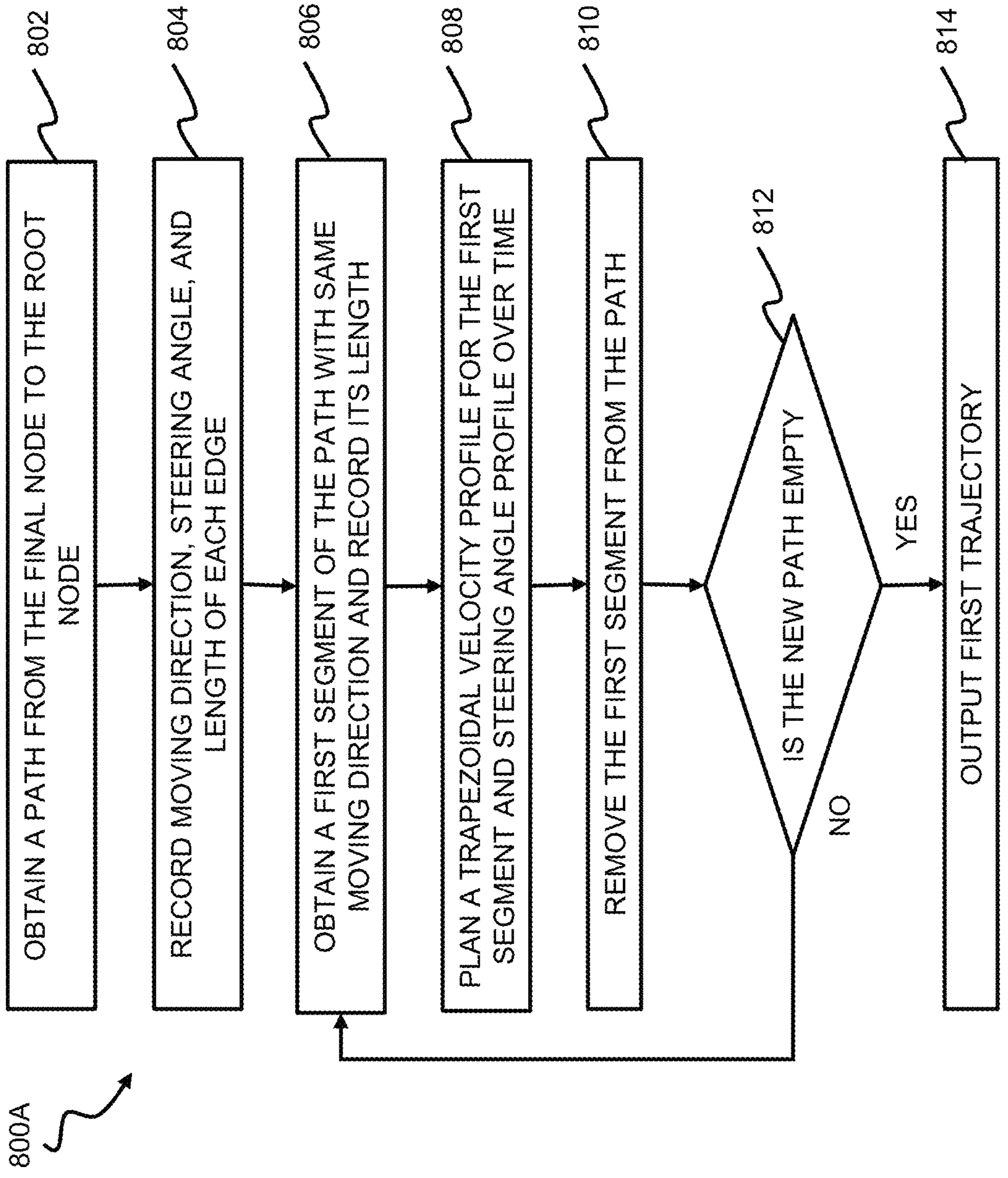
FIG. 8A shows a flow diagram of a method for constructing a first trajectory, in accordance with an embodiment of the present disclosure.

FIG. 8A shows a flow diagram 800A of a method for constructing a first trajectory, in accordance with an embodiment. The first trajectory is constructed based on a graph, such as a tree graph that is constructed based on MPs satisfying the kinematic model. In an example, the first trajectory may define how the vehicle or tractor-trailer 100 moves from the current state, or final node, or goal node to the root node. For example, the first trajectory is constructed as profiles of acceleration a and steering angle s to satisfy the kinematic model and the velocity dynamics $\dot{v}=a$. In another example, the first trajectory is constructed as profiles of acceleration a and the rate of steering angle $\dot{s}$ to satisfy the kinematic model and the velocity and steering angle dynamics.

At 802, a path from the final node or the goal node to the root node is obtained. The path is obtained from the tree $\mathcal{T}$ described in FIGS. 7A-7B. In an example, the path comprises a sequence of nodes, $\mathcal{P}: \overline{X}_1 \rightarrow \ldots \rightarrow \overline{X}_N$, where $\overline{X}_1$ and $\overline{X}_N$ correspond to the final node and the root node, respectively. In other words, a sequence of multiple motion primitives is connected into the path connecting the state related to the goal node (or the final node) with the target state related to root node. The movement between two adjacent nodes, i.e., $\overline{X}_{i-1}$, $\overline{X}_i$, is fully described by $MP(\overline{X}_{i-1}, \overline{X}_i)$, which evolves over X. Hence, the path $\mathcal{P}$ is represented by a sequence of X defined over a finite time interval, e.g., X(t) for $t \in [0, T]$ with a positive constant T. Moreover, a subsequent motion primitive in the sequence has a starting value of a quantized pseudo-trailer-configuration that equals an ending value of the quantized pseudo-trailer-configuration of a previous motion primitive in the sequence.

In this regard, the sequence of X(t) over a path length is parameterized to construct the first trajectory. Given a point X on $\mathcal{P}$, a path length l(X) may be defined as a distance that the vehicle or the tractor-trailer 100 travels from $\overline{X}_1$ to X. It may be noted that $l(\overline{X}_1)=0$. The entire path is then reparametrized over the path length l.

At 804, functions of the path length corresponding to the path $\mathcal{P}$ may be recorded. This may include, but are not limited to, the sequence of vehicle states X(l), moving velocity v(l), and steering angle s(l) that are represented as functions of the path length.

Given l(X) and v(l), at 806, a first segment of $\mathcal{P}$ is obtained. The first segment may have the same moving direction.

Further, at 808, a velocity profile, for example, a trapezoidal velocity profile, to travel the distance of the first segment with zero initial and final velocity is generated, known to those skilled in the art. In an example, the trapezoidal velocity profile may be generated based on to constraints on max acceleration $|a| \leq a_{max}$ and max velocity $|v| \leq v_{max}$. In addition, the steering angle profile may be generated by assigning s according to s(l) and based on change in the path length over time l(t), based on the trapezoidal velocity profile.

Once the first segment is processed, the path $\mathcal{P}$ is updated by removing the first segment, at 810. In a similar manner, the process of obtaining a second first segment of the path, planning the trapezoidal velocity profile on the second segment and the steering angle profile, removing the second segment from the path will be repeated until the path is empty, i.e., all the segments are processed.

At 812, a determination is made to check if the path is empty. On determining that the path is empty, at 814, the first trajectory is generated.

Figure 8B:
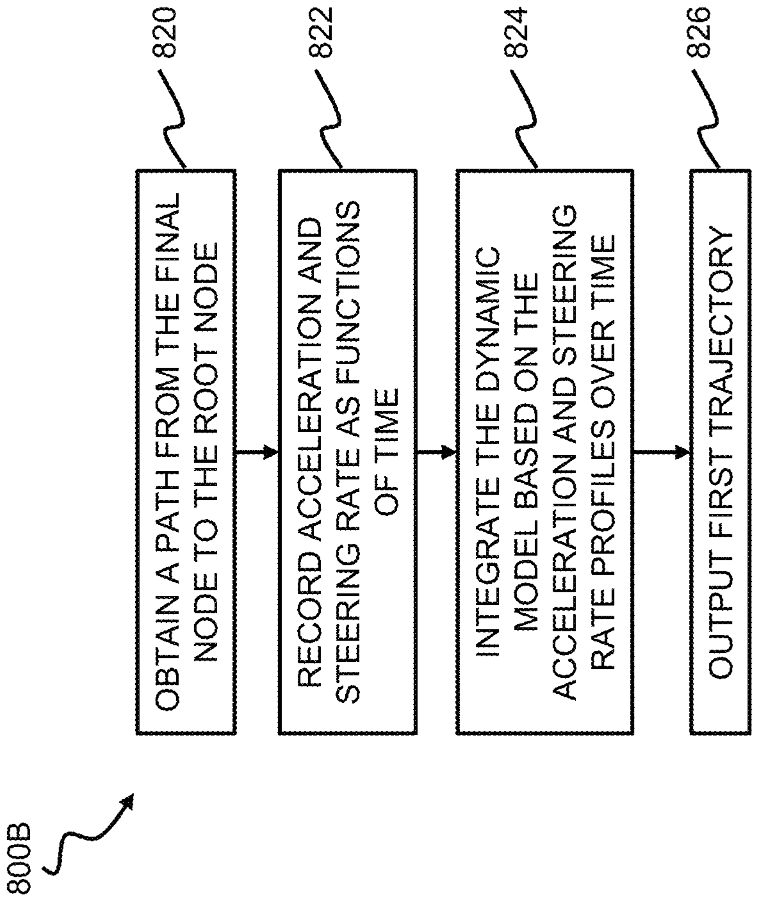
FIG. 8B shows a flow diagram of a method for constructing a first trajectory, in accordance with an embodiment of the present disclosure.

FIG. 8B shows a flow diagram 800B of a method for constructing a first trajectory, in accordance with an embodiment. In accordance with the present embodiment, the first trajectory is generated based on the dynamic model.

In this regard, at 820, the first trajectory is constructed by obtaining the path from the final node to the root node as $\mathcal{P}: \overline{X}_1 \rightarrow \ldots \rightarrow \overline{X}_N$, when all MPs in $\mathcal{M}$ are generated by dynamic model. In some embodiments such MPs have zero initial and final velocities and steering angles. Further, at 822, the acceleration a(t) and steering rate $v_s$ is recorded as functions of time, based on the motion primitive of two adjacent nodes. At 824, the dynamic model is integrated with a(t), $v_s(t)$ 516 as $\mathcal{P}_{ref}(t)$ to obtain the first trajectory. Subsequently, the first trajectory is generated, at 826.

Figure 9A:
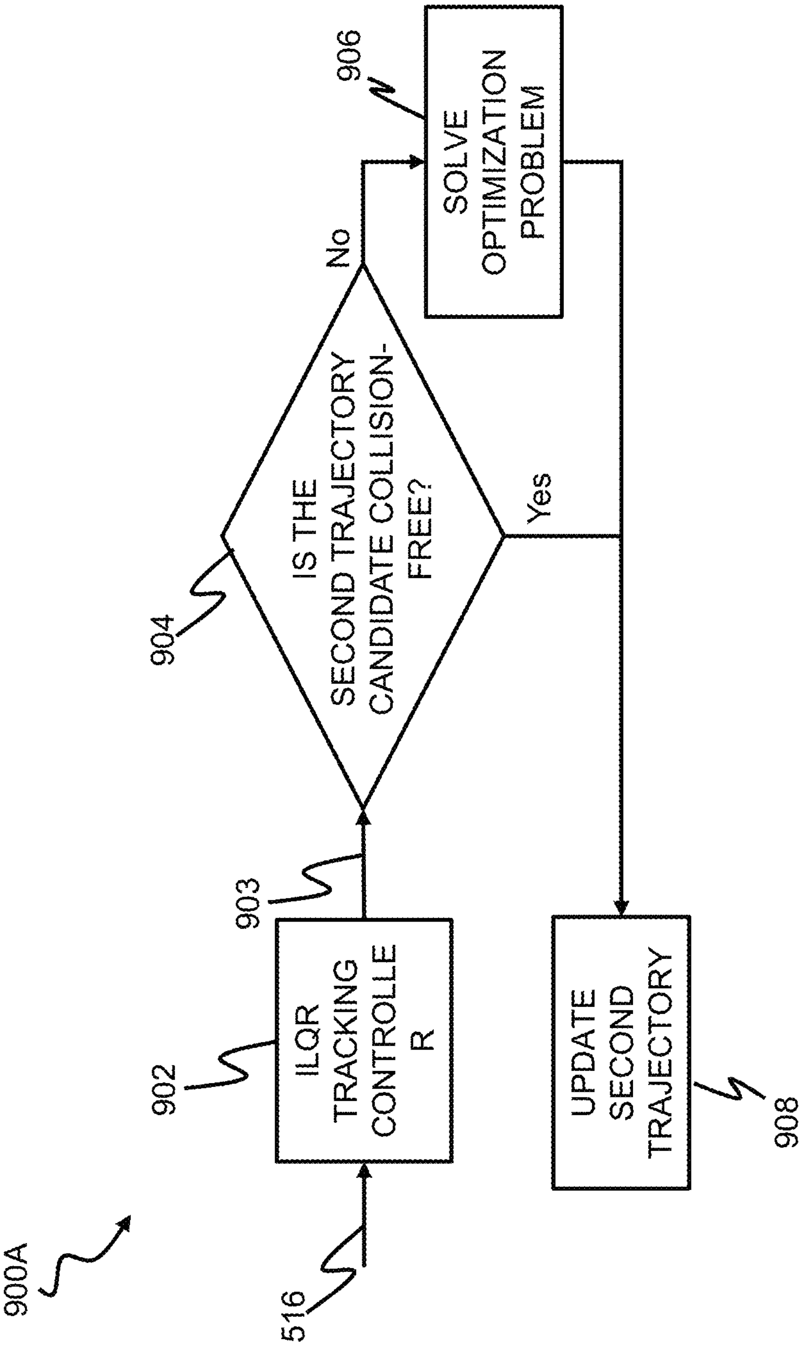
FIG. 9A illustrates a block diagram of a method for constructing a second trajectory, in accordance with an embodiment of the present disclosure.

FIG. 9A shows a block diagram 900A of a method for constructing a second trajectory, in accordance with an embodiment. In this regard, an Iterative Linear Quadratic Regulator (ILQR) controller 902 acquires or receives a reference trajectory. The reference trajectory may be given by the first trajectory 516

$$\mathcal{P}_{ref}: (X_k^r, U_k^r), k = 1, \ldots, N,$$

where k is the time step.

In accordance with an embodiment, the ILQR controller 902 may iteratively compute a control sequence to follow the first trajectory $\mathcal{P}_{ref}$.

Thereafter, the ILQR controller 902 may apply control sequence to the kinematic model in order to generate a new trajectory which is referred to as the LQR solution below. In each iteration, the kinematic model may be linearized along a nominal trajectory to get a linearized model. The nominal trajectory at the first iteration is initialized as the first trajectory. The standard LQR problem is solved for the linearized model. Thereafter, the nominal trajectory is updated using the LQR solution and the updated nominal trajectory is used in the next iteration. Specifically, for the ith iteration, the kinematic model of the tractor-trailer is linearized along the nominal trajectory given by $$\left(X_k^{(i)}, U_k^{(i)}\right), k = 1, \ldots, N.$$

Then, the LQR problem for iteration i is in the standard form where the linearized model is given by $$\begin{bmatrix} X_{k+1} - X_{k+1}^r \\ 1 \end{bmatrix} = A_k \begin{bmatrix} X_k - X_k^r \\ 1 \end{bmatrix} + B_k(U_k - U_k^r),$$

and the system matrices are $$A_k = \begin{bmatrix} \frac{\partial f}{\partial X} & f\left(X_k^{(i)}, U_k^{(i)}\right) - X_{k+1}^r + \frac{\partial f}{\partial X}\left(X_k^r - X_k^{(i)}\right) + \frac{\partial f}{\partial U}\left(U_k^r - U_k^{(i)}\right) \\ 0 & 1 \end{bmatrix},$$

$$B_k = \begin{bmatrix} \frac{\partial f}{\partial U} \\ 0 \end{bmatrix},$$

where f is the right-hand side of the kinematic model of the tractor-trailer system 100. The cost function is given by $$(X_k - X_k^r)^T Q(X_k - X_k^r) + (U_k - U_k^r)^T R(U_k - U_k^r),$$

wherein Q, R are positive definite matrices with appropriate dimensions. After solving the standard LQR problem for iteration i, the resulting LQR controller may be applied to obtain a new nominal trajectory $$\left(X_k^{(i+1)}, U_k^{(i+1)}\right), k = 1, \ldots, N.$$

If a difference between the two nominal trajectories from successive iterations is below a threshold, the algorithm terminates. Otherwise, the kinematic model is linearized along the new nominal trajectory and the aforementioned process is repeated. Herein, 903 represents a second trajectory candidate which may be generated by the ILQR tracking controller 902.

At 904, a collision checking step is performed. If the second trajectory candidate is collision free, the second trajectory, denoted by $$(X_k^*, U_k^*), k = 1, \ldots, N,$$

is obtained successfully. Thereafter, the collision free second trajectory is stored, at 908.

If the second trajectory candidate is not collision free, at 906, a constrained optimization problem associated with the second trajectory candidate is solved.

Figure 9B:
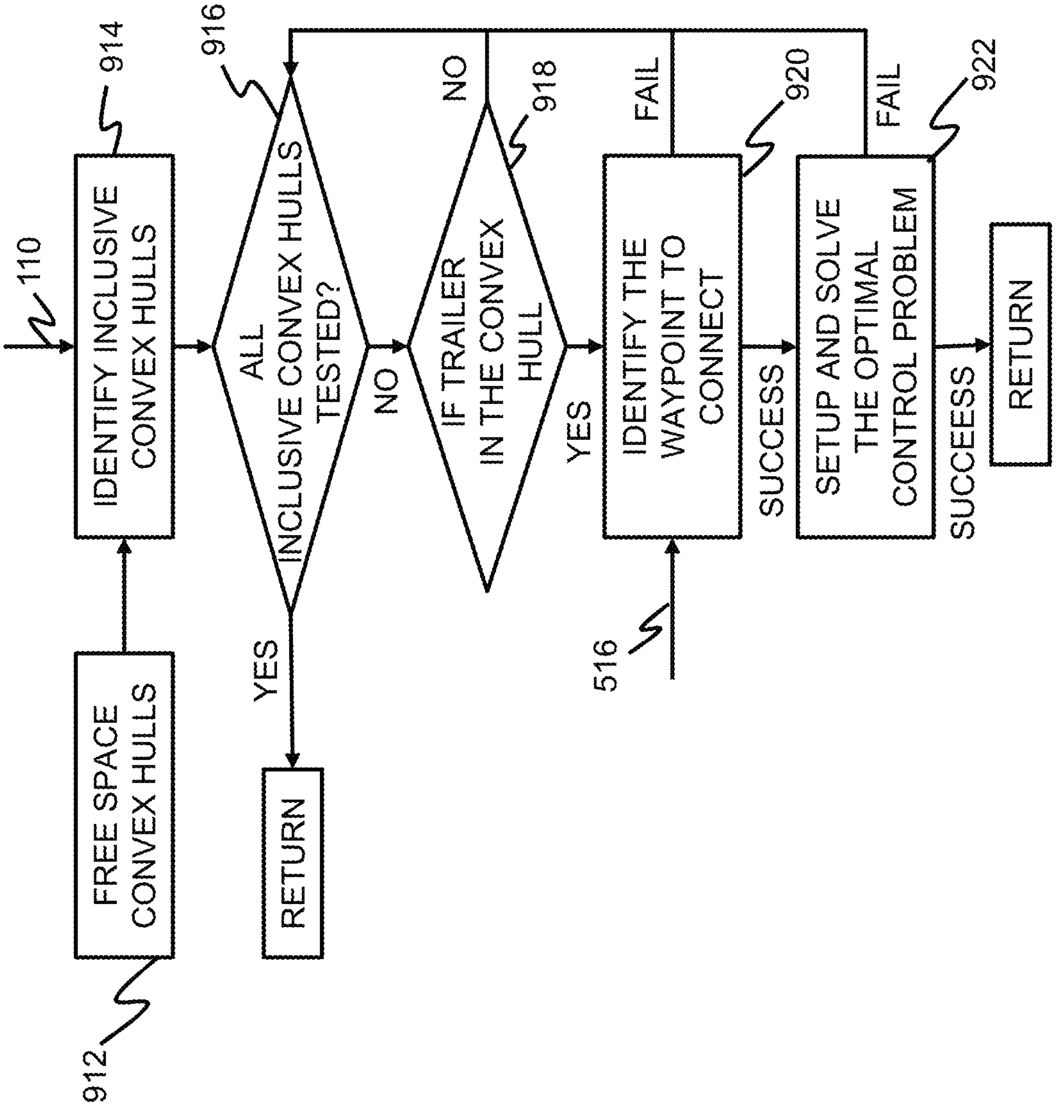
FIG. 9B shows a flowchart of a method for constructing a second trajectory by solving a constrained optimization problem, in accordance with an embodiment of the present disclosure.

FIG. 9B shows a flowchart of a method for constructing a second trajectory by solving a constrained optimization problem, in accordance with an embodiment. There is shown, a set of convex hulls 912 inside free space and the initial state 110 $X_0$ are provided to initiate the method for construction of a second trajectory by optimization.

At 914, a list of inclusive convex hulls that may correspond to or contain the initial state $X_0$ are identified. At 916, a determination is made to check if all inclusive convex hulls have been processed. If all inclusive convex hulls have been processed, the construction of the second trajectory fails and returns. On the other hand, if the convex hulls have not been processed, the process moves to 918.

At 918, a test is performed to ascertain if the tractor-trailer 100 is inside a selected convex hull. In this regard, the inclusive convex hull is selected and removed from the list of inclusive convex hull. On ascertaining that the tractor-trailer 100 is inside a selected convex hull, i.e., true, at 920, a way point is identified from the first trajectory 516 such that the tractor-trailer 100 at the way point is also inside the convex hull.

Once such a way point, denoted by $X_9$, is successfully identified, at 922, a constrained optimization problem is formulated and solved. The constrained optimization problem is given by $$\begin{aligned} U_k^* &= \underset{U_k}{\operatorname{argmin}} \sum_{k=1}^{N} J(X_k, U_k) \\ \text{s.t. } X_{k+1} &= f(X_k, U_k) \\ X_1 &= X_0,\ X_N = X_g, \\ vert_i(X_k) &\in Convexhull, \\ U_{min} &\leq U_k \leq U_{max}, \\ i &= 1, \ldots, \ell;\ k = 1, \ldots, N, \end{aligned}$$

where $vert_i(X_k)$, i=1, . . . , $\ell$ are all the vertices of the tractor and trailers. The constraints $vert_i(X_k) \in$ Convexhull require that all the vertices of the tractor 101 and the trailers 105A-105C are inside the convex hull, which indicates that the tractor-trailer is collision free. The optimization problem is solved using any state-of-the-art nonlinear programming solvers, e.g., IPOPT. The solution of the optimization problem, if found, is identified as the second trajectory $$(X_k^*, U_k^*), k = 1, \ldots, N.$$

The second trajectory may then be stored. Thereafter, the motion of the tractor-trailer 100 may be controlled according to the motion path, i.e., the second trajectory.

Figure 10:
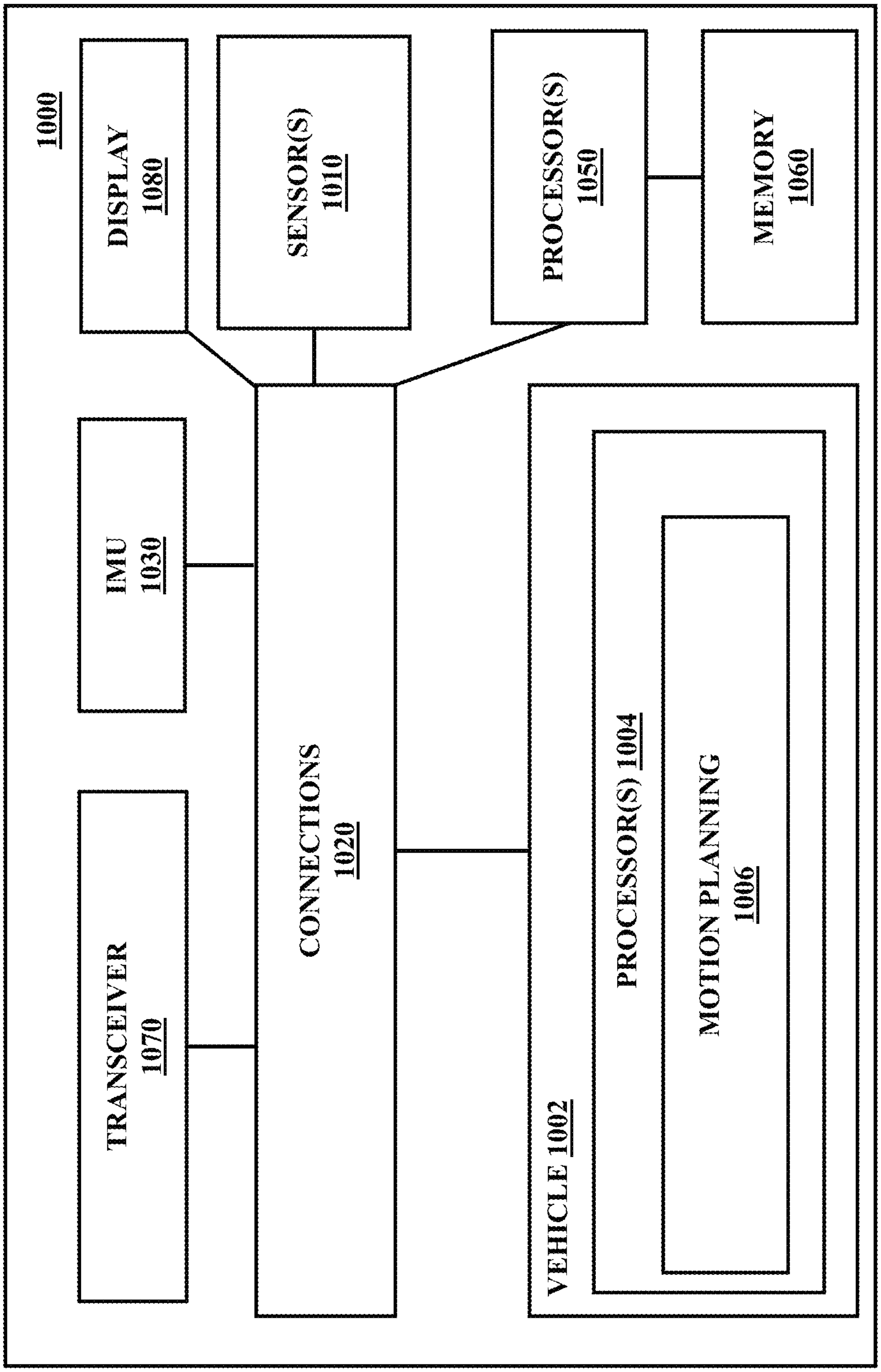
FIG. 10 shows a schematic of a system, in accordance with an embodiment of the present disclosure.

FIG. 10 shows a schematic of a system 1000, in accordance with an embodiment. The system 1000 includes a vehicle 1002 including a processor 1004 configured for performing motion planning 1006. The vehicle 1002 also includes at least one sensor, such as a LIDAR and/or a camera. The LIDAR sensor is a low-resolution first sensor and the camera is a high-resolution second sensor. The sensors may be operatively connected to the processor 1004 and is configured for sensing information indicative of the initial state and the target state of the vehicle 1002. The vehicle 1002 may be a tractor trailer type vehicle as described in previous embodiments. Using this information, the processor 1004 is configured to perform motion and path planning for the vehicle 1002 using one or more techniques described above in previous embodiments.

The system 1000 may include one or combination of a sensor such as a camera 1010, an inertial measurement unit (IMU) 1030, a processor 1050, a memory 1060, a transceiver 1070, and a display/screen 1080, which can be operatively coupled to other components through connections 1020. The connections 1020 can comprise buses, lines, fibers, links, or combination thereof.

The transceiver 1070 can, for example, include a transmitter enabled to transmit one or more signals over one or more types of wireless communication networks and a receiver to receive one or more signals transmitted over the one or more types of wireless communication networks. The transceiver 1070 can permit communication with wireless networks based on a variety of technologies such as, but not limited to, femtocells, Wi-Fi networks or Wireless Local Area Networks (WLANs), which may be based on the IEEE 802.11 family of standards, Wireless Personal Area Networks (WPANS) such Bluetooth, Near Field Communication (NFC), networks based on the IEEE 802.15x family of standards, and/or Wireless Wide Area Networks (WWANs) such as LTE, WiMAX, etc. The system 1000 can also include one or more ports for communicating over wired networks.

In some embodiments, the system 1000 may include image sensors such as CCD or CMOS sensors, lasers and/or camera 1010, which are hereinafter referred to as "sensor 1010". For example, the sensor 1010 can convert an optical image into an electronic or digital image and can send acquired images to processor 1050. Additionally, or alternatively, the sensor 1010 can sense the light reflected from a target object in a scene and submit the intensities of the captured light to the processor 1050.

For example, the sensor 1010 may include color or grayscale cameras, which provide "color information." The term "color information" as used herein refers to color and/or grayscale information. In general, as used herein, a color image or color information can be viewed as comprising 1 to N channels, where N is some integer dependent on the color space being used to store the image. For example, an RGB image comprises three channels, with one channel each for Red, Blue, and Green information.

For example, the sensor 1010 may include a depth sensor for providing "depth information." The depth information can be acquired in a variety of ways using depth sensors. The term "depth sensor" is used to refer to functional units that may be used to obtain depth information independently and/or in conjunction with some other cameras. For example, in some embodiments, the depth sensor and the optical camera can be part of the sensor 1010. For example, in some embodiments, the sensor 1010 includes RGBD cameras, which may capture per-pixel depth (D) information when the depth sensor is enabled, in addition to color (RGB) images.

As another example, in some embodiments, the sensor 1010 may include a 3D Time Of Flight (3DTOF) camera. In embodiments with 3DTOF camera, the depth sensor can take the form of a strobe light coupled to the 3DTOF camera, which can illuminate objects in a scene and reflected light can be captured by a CCD/CMOS sensor in the sensing module. Depth information can be obtained by measuring the time that the light pulses take to travel to the objects and back to the sensor.

As a further example, the depth sensor can take the form of a light source coupled to the sensor 1010. In one embodiment, the light source projects a structured or textured light pattern, which can include one or more narrow bands of light, onto objects in a scene. Depth information is obtained by exploiting geometrical distortions of the projected pattern caused by the surface shape of the object. One embodiment determines depth information from stereo sensors such as a combination of an infra-red structured light projector and an infra-red camera registered to a RGB camera.

In some embodiments, the sensor 1010 includes stereoscopic cameras. For example, a depth sensor may form part of a passive stereo vision sensor, which may use two or more cameras to obtain depth information for a scene. The pixel coordinates of points common to both cameras in a captured scene may be used along with camera pose information and/or triangulation techniques to obtain per-pixel depth information.

In some embodiments, the system 1000 can be operatively connected to multiple sensors 1010, such as dual front cameras and/or a front and rear-facing cameras, which may also incorporate various sensors. In some embodiments, the sensors 1010 can capture both still and video images. In some embodiments, the sensor 1010 can include RGBD or stereoscopic video cameras capable of capturing images at, e.g., 30 frames per second (fps). In one embodiment, images captured by the sensor 1010 can be in a raw uncompressed format and can be compressed prior to being processed and/or stored in memory 1060. In some embodiments, image compression can be performed by the processor 1050 using lossless or lossy compression techniques.

In some embodiments, the processor 1050 can also receive input from IMU 1030. In other embodiments, the IMU 1030 can comprise 3-axis accelerometer(s), 3-axis gyroscope(s), and/or magnetometer(s). The IMU 1030 can provide velocity, orientation, and/or other position related information to the processor 1050. In some embodiments, the IMU 1030 can output measured information in synchronization with the capture of each image frame by the sensor 1010. In some embodiments, the output of the IMU 1030 is used in part by the processor 1050 to fuse the sensor measurements and/or to further process the fused measurements.

The system 1000 can also include a screen or display 1080 rendering images, such as color and/or depth images. In some embodiments, the display 1080 can be used to display live images captured by the sensor 1010, fused images, augmented reality (AR) images, graphical user interfaces (GUIs), and other program outputs. In some embodiments, the display 1080 can include and/or be housed with a touchscreen to permit users to input data via some combination of virtual keyboards, icons, menus, or other GUIs, user gestures and/or input devices such as styli and other writing implements. In some embodiments, the display 1080 can be implemented using a liquid crystal display (LCD) display or a light emitting diode (LED) display, such as an organic LED (OLED) display. In other embodiments, the display 480 can be a wearable display. In some embodiments, the result of the fusion may be rendered on the display 1080 or submitted to different applications that can be internal or external to the system 1000.

Exemplary system 1000 can also be modified in various ways in a manner consistent with the disclosure, such as, by adding, combining, or omitting one or more of the functional blocks shown. For example, in some configurations, the system 1000 does not include the IMU 1030 or the transceiver 1070. Further, in certain example implementations, the system 1000 include a variety of other sensors (not shown) such as an ambient light sensor, microphones, acoustic sensors, ultrasonic sensors, laser range finders, etc. In some embodiments, portions of the system 1000 take the form of one or more chipsets, and/or the like.

The processor 1050 can be implemented using a combination of hardware, firmware, and software. The processor 1050 can represent one or more circuits configurable to perform at least a portion of a computing procedure or process related to sensor fusion and/or methods for further processing the fused measurements. The processor 1050 retrieves instructions and/or data from memory 1060. The processor 1050 can be implemented using one or more application specific integrated circuits (ASICs), central and/or graphical processing units (CPUs and/or GPUs), digital signal processors (DSPs), digital signal processing devices (DSPDs), programmable logic devices (PLDs), field programmable gate arrays (FPGAs), controllers, micro-controllers, microprocessors, embedded processor cores, electronic devices, other electronic units designed to perform the functions described herein, or a combination thereof.

The memory 1060 can be implemented within the processor 1050 and/or external to the processor 1050. As used herein the term "memory" refers to any type of long term, short term, volatile, nonvolatile, or other memory and is not to be limited to any particular type of memory or number of memories, or type of physical media upon which memory is stored. In some embodiments, the memory 1060 holds program codes that facilitate the automated parking or motion planning of tractor-trailer-based vehicle 1002.

For example, the memory 1060 can store the measurements of the sensors, such as still images, depth information, video frames, program results, as well as data provided by the IMU 1030 and other sensors. The memory 1060 can store a memory storing a geometry of the vehicle 1002, a map of the parking space environment 150, a kinematic model of the vehicle 1002, and a dynamic model of the vehicle 1002. In general, the memory 1060 may represent any data storage mechanism. The memory 1060 can include, for example, a primary memory and/or a secondary memory. The primary memory can include, for example, a random-access memory, read only memory, etc. While illustrated in FIG. 10 as being separate from the processors 1050, it should be understood that all or part of a primary memory can be provided within or otherwise co-located and/or coupled to the processors 1050.

Secondary memory can include, for example, the same or similar type of memory as primary memory and/or one or more data storage devices or systems, such as, for example, flash/USB memory drives, memory card drives, disk drives, optical disc drives, tape drives, solid state drives, hybrid drives etc. In certain implementations, secondary memory can be operatively receptive of, or otherwise configurable to a non-transitory computer-readable medium in a removable media drive (not shown). In some embodiments, the non-transitory computer readable medium forms part of the memory 1060 and/or the processor 1050.

The above-described embodiments of the present disclosure can be implemented in any of numerous ways. For example, the embodiments may be implemented using hardware, software, or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the disclosure may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed but are used merely as labels to distinguish one claim element having a certain name from another element having a same name (but for use of the ordinal term) to distinguish the claim elements.

Although the disclosure has been described by way of examples of preferred embodiments, it is to be understood that various other adaptations and modifications can be made within the spirit and scope of the disclosure.

Therefore, it is the object of the appended claims to cover all such variations and modifications as come within the true spirit and scope of the disclosure.

The invention claimed is:

1. A system for controlling a motion of a trailer-based vehicle from an initial state till a target state, wherein each state includes at least a location and a heading of the trailer-based vehicle, wherein the trailer-based vehicle includes a tractor and at least one trailer attached to the tractor such that a motion of the tractor controls a motion of the trailer, the system comprising:

a motion planner including a processor configured to collect a set of motion primitives parameterized on a quantized pseudo-trailer-configuration from a finite set of quantized pseudo-trailer-configurations defined in a reduced state space resulting by enforcing an algebraic constraint on a configuration of the trailer-based vehicle in an original state space, wherein the algebraic constraint defines a relationship between a steering input of the tractor and a resultant spatial configuration of the at least one trailer, wherein the configuration of the trailer-based vehicle with the algebraic constraint enforced thereon corresponds to a stable circular configuration associated with driving the trailer-based vehicle with a fixed steering angle for a time period such that a relative angle between the at least one trailer and the tractor is stabilized, each motion primitive configured to move the trailer-based vehicle from a pseudo-trailer-configuration induced initial state relating to the finite set of quantized pseudo-trailer-configurations to another pseudo-trailer-configuration induced target state having a same or different pseudo-trailer-configuration relating to the finite set of quantized pseudo-trailer-configurations;

repetitively select a node based on corresponding cost, and apply motion primitives at the selected node based on a corresponding pseudo-trailer-configuration to add new nodes having pseudo-trailer-configurations belonging to a set of all possible values, wherein a tractor configuration, $x,y,\theta_0$, is arbitrary;

perform an off-grid, online search of motion primitives for the quantized pseudo-trailer configuration and connect a sequence of multiple motion primitives into a motion path connecting the initial state with the target state, wherein a starting value of a quantized pseudo-trailer-configuration of a subsequent motion primitive in the sequence equals an ending value of a quantized pseudo-trailer-configuration of a previous motion primitive in the sequence; and control the motion of the trailer-based vehicle according to the motion path, and wherein the processor is further configured to, for each selected node, determine whether the selected node is being selected for a first time, and responsive to determining that the selected node is being selected for the first time:

categorize motion primitives associated with the selected node into a plurality of modes including forward-left, forward-right, backward-left, and backward-right;

compute, for each mode of the plurality of modes, a mode cost as an average of costs of motion primitives belonging to the mode, each motion primitive cost is based on (i) a cost of the motion primitive and (ii) a heuristic cost of a child node generated by applying the motion primitive;

select a mode having a minimum mode cost; and apply motion primitives associated with the selected mode.

2. The system of claim 1, wherein the set of motion primitives includes multiple motion primitives pre-calculated for each pseudo-trailer-configuration induced state with an initial state of the tractor configuration being (0,0,0), wherein the starting value of the quantized pseudo-trailer configuration belongs to the finite set of pseudo-trailer configurations.

3. The system of claim 2, wherein motion primitives for the starting value or motion primitives for the ending value include multiple motion primitives with a same pseudo-trailer configuration but moving the trailer-based vehicle into different locations.

4. The system of claim 3, wherein the pseudo-trailer-configuration is represented by a steering angle value, and relative angles between headings of the at least one trailer attached to the tractor are functions of steering angles.

5. The system of claim 3, wherein the pseudo-trailer-configuration is represented by a relative angle between a heading of the tractor and an heading of an adjacent trailer, and headings of the trailers are functions of the pseudo-trailer-configuration.

6. The system of claim 1, the processor being further configured to:

construct a graph having multiple nodes defining states of the trailer-based vehicle with tractor configurations being unrestricted to pre-defined real values, wherein the nodes include at least one of a final node or a goal node defining the initial state of the trailer-based vehicle, and a root node defining the target state of the trailer-based vehicle, wherein each pair of nodes in the graph is connected with an edge defined by a collision-ignorant motion primitive from the set of motion primitives;

determine a first trajectory from at least one of the final node or the goal node to the root node of the graph; and determine a second trajectory from the initial state to the root node of the graph.

7. The system of claim 6, wherein, for determining the first trajectory, the processor is configured to:

obtain a path from at least one of the final node or the goal node to the root node of the graph;

record a moving direction, a steering action, and lengths of each edge;

acquire a first segment of the path with same moving direction;

plan velocity and steering profiles for the first segment, based on the moving direction;

remove the first segment from the path; and repeat recording, acquiring, planning, and removing until the path is empty.

8. The system of claim 6, wherein, to determine the second trajectory, the processor is configured to:

pass the first trajectory to an iterative linear quadratic regulator (ILQR) to produce a second trajectory candidate;

check collision of the second trajectory candidate; and output the second trajectory candidate as the second trajectory if it is collision-ignorant, else, solve an optimization problem for the second trajectory.

9. The system of claim 1, the processor being further configured to:

select nodes of the graph according to a cost of each of the selected nodes, wherein the cost of a node includes a cost of arrival and an estimated cost-to-go determined by evaluating a heuristic function.

10. The system of claim 9, the processor being further configured to:

calculate the estimated cost-to-go of each of the selected nodes using a neural network.

11. The system of claim 10, wherein the neural network has an input as two states of the trailer-based vehicle in one of the original state space or the reduced state space.

12. The system of claim 10, wherein the cost-to-go is estimated by a finite number of neural networks, each neural network having a different pseudo-trailer-configuration induced state for its target state.

13. The system of claim 10, wherein the neural network is trained using reinforcement learning with a sparse reward function.

14. The system of claim 10, wherein the neural network is obtained by training with supervised learning.

15. A method for controlling a motion of a trailer-based vehicle from an initial state till a target state, wherein each state includes at least a location and a heading of the trailer-based vehicle, wherein the trailer-based vehicle includes a tractor and at least one trailer attached to the tractor such that a motion of the tractor controls a motion of the trailer, the method comprising:

collecting a set of motion primitives parameterized on a quantized pseudo-trailer-configuration from a finite set of quantized pseudo-trailer-configurations defined in a reduced state space resulting by enforcing an algebraic constraint on a configuration of the trailer-based vehicle in an original state space, wherein the algebraic constraint defines a relationship between a steering input of the tractor and a resultant spatial configuration of the at least one trailer, wherein the configuration of the trailer-based vehicle with the algebraic constraint enforced thereon corresponds to a stable circular configuration associated with driving the trailer-based vehicle with a fixed steering angle for a time period such that a relative angle between the at least one trailer and the tractor is stabilized, each motion primitive configured to move the trailer-based vehicle from a pseudo-trailer-configuration induced initial state relating to the finite set of quantized pseudo-trailer-configurations to another pseudo-trailer-configuration induced target state having a same or different pseudo-trailer-configuration relating to the finite set of quantized pseudo-trailer-configurations;

repetitively selecting a node based on a corresponding cost, and applying motion primitives at the selected node based on a corresponding pseudo-trailer-configuration to add new nodes having pseudo-trailer-configurations belonging to a set of all possible values, wherein a tractor configuration, $x,y,\theta_0$, is arbitrary;

performing an off-grid, online search of motion primitives for the quantized pseudo-trailer configuration and connecting a sequence of multiple motion primitives into a motion path connecting the initial state with the target state, wherein a starting value of a quantized pseudo-trailer-configuration of a subsequent motion primitive in the sequence equals an ending value of a quantized pseudo-trailer-configuration of a previous motion primitive in the sequence; and controlling the motion of the tractor-trailer according to the motion path and wherein, for each selected node, determining whether the selected node is being selected for a first time, and responsive to determining that the selected node is being selected for the first time:

categorizing motion primitives associated with the selected node into a plurality of modes including forward-left, forward-right, backward-left, and backward-right;

computing, for each mode of the plurality of modes, a mode cost as an average of costs of motion primitives belonging to the mode, each motion primitive cost is based on (i) a cost of the motion primitive and (ii) a heuristic cost of a child node generated by applying the motion primitive;

selecting a mode having a minimum mode cost; and applying motion primitives associated with the selected mode.

16. The method of claim 15, wherein the set of motion primitives includes multiple motion primitives pre-calculated for each pseudo-trailer-configuration induced state with an initial state of the tractor configuration being (0,0,0), wherein the starting value of the quantized pseudo-trailer configuration relates to the finite set of quantized pseudo-trailer configurations.

17. The method of claim 16, wherein motion primitives for the starting value or motion primitives for the ending value include multiple motion primitives with a same pseudo-trailer configuration but moving the tractor-trailer into different locations.

18. The method of claim 15, the method further comprising:

constructing a graph having multiple nodes defining states of the trailer-based vehicle with tractor configurations being unrestricted to pre-defined real values, wherein the nodes include at least one of a final node or a goal node defining the initial state of the trailer-based vehicle, and a root node defining the target state of the trailer-based vehicle, wherein each pair of nodes in the graph is connected with an edge defined by a collision-ignorant motion primitive from the set of motion primitives;

determining a first trajectory from at least one of the final node or the goal node to the root node of the graph; and determining a second trajectory from the initial node to the root node of the graph.

19. A non-transitory computer readable storage medium embodied thereon a program executable by a processor for performing a method, the method comprising:

collecting a set of motion primitives parameterized on a quantized pseudo-trailer-configuration from a finite set of quantized pseudo-trailer-configurations defined in a reduced state space resulting by enforcing an algebraic constraint on a configuration of the trailer-based vehicle in an original state space, wherein the algebraic constraint defines a relationship between a steering input of the tractor and a resultant spatial configuration of the at least one trailer, wherein the configuration of the trailer-based vehicle with the algebraic constraint enforced thereon corresponds to a stable circular configuration associated with driving the trailer-based vehicle with a fixed steering angle for a time period such that a relative angle between the at least one trailer and the tractor is stabilized, each motion primitive configured to move a trailer-based vehicle from a pseudo-trailer-configuration induced initial state relating to the finite set of quantized pseudo-trailer-configurations to another pseudo-trailer-configuration induced target state having a same or different pseudo-trailer-configuration relating to the finite set of quantized pseudo-trailer-configurations;

repetitively selecting a node based on a corresponding cost, and applying motion primitives at the selected node based on a corresponding pseudo-trailer-configuration to add new nodes which have pseudo-trailer-configurations belonging to a set of all possible values, wherein a tractor configuration, $x,y,\theta_0$, is arbitrary;

performing an off-grid, online search of motion primitives for the quantized pseudo-trailer configuration and connecting a sequence of multiple motion primitives into a motion path connecting the initial state with the target state, wherein a starting value of a quantized pseudo-trailer-configuration of a subsequent motion primitive in the sequence equals an ending value of a quantized pseudo-trailer-configuration of a previous motion primitive in the sequence; and controlling the motion of the tractor-trailer according to the motion path and wherein, for each selected node, determining whether the selected node is being selected for a first time, and responsive to determining that the selected node is being selected for the first time:

categorizing motion primitives associated with the selected node into a plurality of modes including forward-left, forward-right, backward-left, and backward-right;

computing, for each mode of the plurality of modes, a mode cost as an average of costs of motion primitives belonging to the mode, each motion primitive cost is based on (i) a cost of the motion primitive and (ii) a heuristic cost of a child node generated by applying the motion primitive;

selecting a mode having a minimum mode cost; and applying motion primitives associated with the selected mode.

* * * * *